(12) United States Patent
Suzuki et al.

(10) Patent No.: US 9,510,249 B2
(45) Date of Patent: Nov. 29, 2016

(54) WIRELESS COMMUNICATION SYSTEM, COMMUNICATION METHOD, BASE STATION, AND MOBILE TERMINAL

(71) Applicant: Sharp Kabushiki Kaisha, Osaka-shi, Osaka (JP)

(72) Inventors: Kouki Suzuki, Osaka (JP); Shinichi Sawada, Osaka (JP); Tadashi Shimonabe, Osaka (JP); Shigeto Suzuki, Osaka (JP); Mitsuru Sakamoto, Osaka (JP); Yuhsuke Takagi, Osaka (JP); Akio Yoshihara, Osaka (JP); Shumpei Fuse, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 14/378,132

(22) PCT Filed: Feb. 6, 2013

(86) PCT No.: PCT/JP2013/052717
§ 371 (c)(1),
(2) Date: Aug. 12, 2014

(87) PCT Pub. No.: WO2013/121949
PCT Pub. Date: Aug. 22, 2013

(65) Prior Publication Data
US 2015/0030000 A1    Jan. 29, 2015

(30) Foreign Application Priority Data
Feb. 13, 2012   (JP) .................................. 2012-028728

(51) Int. Cl.
*H04W 36/00* (2009.01)
*H04W 36/04* (2009.01)

(52) U.S. Cl.
CPC ..... *H04W 36/0061* (2013.01); *H04W 36/0055* (2013.01); *H04W 36/0072* (2013.01); *H04W 36/04* (2013.01)

(58) Field of Classification Search
CPC .................... H04W 36/0061; H04W 36/0055; H04W 36/0072; H04W 36/04
See application file for complete search history.

(56) References Cited

U.S. PATENT DOCUMENTS

| | | | |
|---|---|---|---|
| 6,625,455 | B1 | 9/2003 | Ariga |
| 2004/0029560 | A1 | 2/2004 | Ariga |

(Continued)

FOREIGN PATENT DOCUMENTS

| | | |
|---|---|---|
| JP | 11-069412 A | 3/1999 |
| JP | 2006-129194 A | 5/2006 |

(Continued)

OTHER PUBLICATIONS

Official Communication issued in International Patent Application No. PCT/JP2013/052717, mailed on Mar. 5, 2013.

(Continued)

*Primary Examiner* — Mohammad Anwar
(74) *Attorney, Agent, or Firm* — Keating & Bennett, LLP

(57) ABSTRACT

A wireless communication system allows a handover operation to a base station communicating through a plurality of frequency bands. The mobile terminal includes a communication unit adapted to perform communication with any of the base stations through a plurality of frequency bands. The communication unit of the base station notifies, when communication through a plurality of frequency bands is possible, a mobile terminal about information directed to identifying a main frequency band from relevant frequency bands in a manner allowing discrimination from one or more frequency bands other than the main frequency band. The communication unit of the mobile terminal determines that, upon receiving information directed to identifying a main frequency band from the second base station during having communication connection with the first base station, that the frequency band identified by the relevant information is a subject of handover towards the second base station.

2 Claims, 16 Drawing Sheets

(56) References Cited

U.S. PATENT DOCUMENTS

| | | | |
|---|---|---|---|
| 2009/0239537 A1 | 9/2009 | Iwamura et al. | |
| 2010/0322185 A1 | 12/2010 | Park et al. | |
| 2011/0243066 A1* | 10/2011 | Nayeb Nazar | H04L 1/007 370/328 |
| 2013/0100931 A1* | 4/2013 | Kim | H04L 5/001 370/331 |

FOREIGN PATENT DOCUMENTS

| | | |
|---|---|---|
| JP | 2007-129588 A | 5/2007 |
| JP | 2008-301086 A | 12/2008 |
| JP | 2010-062711 A | 3/2010 |
| JP | 2011-010210 A | 1/2011 |
| JP | 2012-004767 A | 1/2012 |
| JP | 2012-009945 A | 1/2012 |
| WO | 2010/146941 A1 | 12/2010 |
| WO | 2011/136504 A2 | 11/2011 |

OTHER PUBLICATIONS

"3rd Generation Partnership Project; Technical Specification Group Radio Access Network; Evolved Universal Terrestrial Radio Access (E-UTRA); and Evolved Universal Terrestrial Radio Access Network (E-UTRAN); Overall Description, Stage 2 (Release 11)," 3GPP TS 36.300, V11.0.0, Dec. 2011, pp. 1-194.

Sec. 5.3.5.4, "3rd Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331, V10.4.0, Dec. 2011, 15 pages.

* cited by examiner

FIG.2
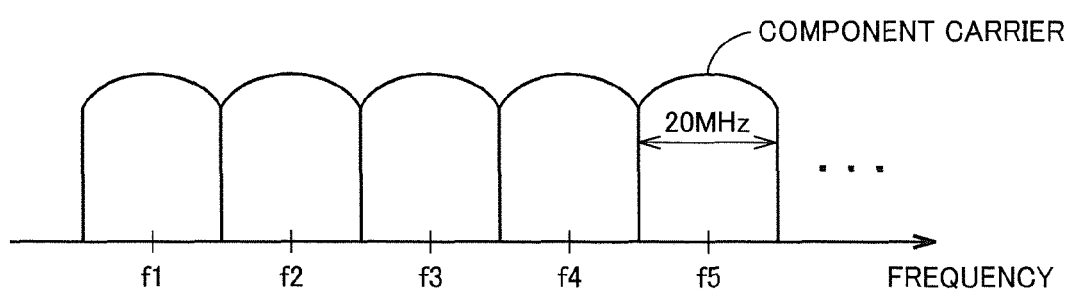
(A)
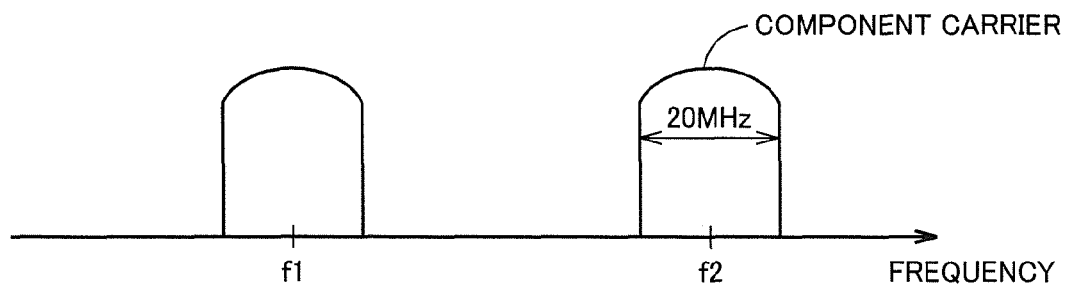
(B)

WIRELESS COMMUNICATION SYSTEM, COMMUNICATION METHOD, BASE STATION, AND MOBILE TERMINAL

TECHNICAL FIELD

The present invention relates to a wireless communication system including a mobile terminal and a plurality of base stations, a communication method of the wireless communication system, and a base station and a mobile terminal directed to the wireless communication system. Particularly, the present invention relates to a configuration in which a base station can communicate with a mobile terminal through a plurality of frequency bands.

BACKGROUND ART

Currently, 3GPP (Third Generation Partnership Project) is now moving towards introducing a Home evolved Node B (hereinafter, also referred to as "HeNB") in addition to the general evolved Node B (hereinafter, also referred to as "eNB") in LTE (Long Term Evolution) that is the next generation communication scheme and in LTE-A (LTE-Advanced) that is an advanced version of LTE. The HeNB is directed to enlarging the service area and is for individual use.

In general, a HeNB is envisaged to provide a cell area smaller than the cell area provided by an eNB. Hereinafter, a cell provided by an eNB is also referred to as a "macrocell", whereas a cell provided by a HeNB is referred to as a "home cell".

The handover of a mobile terminal (User Equipment) currently connected in communication with an eNB (macrocell) to a HeNB (the inbound handover to a HeNB) is already determined (referred to Non-Patent Document 1 and Non-Patent Document 2). Specifically, Non-Patent Document 1 discloses the process when a HeNB is selected as the handover target during communication connection of a mobile terminal with an eNB.

Moreover, introducing carrier aggregation for LTE-A is considered at 3GPP. Carrier aggregation is the technique to expand the maximum transmission bandwidth that can be supported as wide as 100 MHz from 20 MHz that is the maximum transmission bandwidth of LTE. In order to support such a bandwidth of 100 MHz, usage of a plurality of component carriers corresponding to 20 MHz that is the maximum transmission bandwidth of LTE to carry out data transmission and reception between a mobile terminal and a base station is anticipated.

CITATION LIST

Patent Document

PTD 1: Japanese Patent Laying-Open No. 11-069412
PTD 2: Japanese Patent Laying-Open No. 2006-129194
PTD 3: Japanese Patent Laying-Open No. 2008-301086
PTD 4: Japanese Patent Laying-Open No. 2010-062711
PTD 5: Japanese Patent Laying-Open No. 2011-010210

Non-Patent Document

Non-Patent Document 1: 3GPP Organizational Partners, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.0.0 (2011-12)

Non-Patent Document 2: 3GPP Organizational Partners, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.4.0 (2011-12)

SUMMARY OF INVENTION

Technical Problem

In the aforementioned carrier aggregation, each component carrier is handled as a logical cell. Therefore, during usage of carrier aggregation, a different cell identifier (hereinafter, also referred to as "cell ID") is assigned to each component carrier in an eNB (macrocell).

In contrast, according to the specification, it is determined that only one cell ID is to be used in the operation of a HeNB (home cell).

Therefore, when carrier aggregation is to be performed at a HeNB, the same cell ID has to be used between a plurality of component carriers since only one cell ID is assigned. When a mobile terminal is to perform inbound handover towards a HeNB, there is a problem that which component carrier (cell) is to be the target of handover cannot be identified by just the cell ID.

In view of the foregoing, an object of the present invention is to provide a wireless communication system, a communication method, a base station, and a mobile terminal that can simplify the handover operation to a base station that is communicating through a plurality of frequency bands.

Solution to Problem

According to an aspect of the present invention, a wireless communication system including a mobile terminal and a plurality of base stations is provided. The mobile terminal includes communication means adapted to perform communication with an arbitrary base station through a plurality of frequency bands. The base station includes communication means for communicating with a mobile terminal, and handover means for performing handover with at least one other base station. The communication means of the base station notifies, when communication through a plurality of frequency bands is allowed, the mobile terminal about information directed to identifying a main frequency band from the plurality of frequency bands, in a manner allowing discrimination from one or more frequency bands other than the main frequency band. The communication means of the mobile terminal determines that, when information directed to identifying the main frequency band is received from a second base station during communication connection with a first base station, a frequency band identified by said information is a subject of handover to the second base station.

Preferably, the communication means of the base station transmits corresponding identification information through the main frequency band, and transmits invalid identification information through one or more frequency bands other than the main frequency band.

Preferably, the communication means of the base station transmits corresponding identification information through the main frequency band, and does not transmit identification information through the one or more frequency bands other than the main frequency band.

Further preferably, the identification information includes a cell ID.

Preferably, the communication means of the base station transmits identification information corresponding to a frequency band, together in the broadcast information.

Preferably, the identification information includes a physical cell ID.

Preferably, the handover means notifies an upper network to transfer data directed to a cell associated with one or more frequency bands other than the main frequency band to a cell associated with the main frequency band, and the communication means of the base station transmits data addressed to the cell associated with the main frequency band, received from an upper network, to a mobile terminal through the main frequency band and the one or more frequency bands other than the main frequency band.

According to another aspect of the present invention, there is provided a communication method between a mobile terminal and a plurality of base stations. The communication method includes the steps of: notifying, when communication through a plurality of frequency bands is allowed, information directed to identifying a main frequency band from the plurality of frequency bands from a base station to a mobile terminal in a manner allowing discrimination from the one or more frequency bands other than the main frequency band; when the mobile terminal receives information directed to identifying the main frequency band from the second base station during communication connection with the first base station, determining the frequency band identified by the relevant information as a subject of handover to the second base station; the second base station performing handover to the first base station in response to a request from the mobile terminal through the identified frequency band; and the mobile terminal communicating with the second base station through the plurality of frequency bands.

According to still another aspect of the present invention, there is provided a base station allowing communication with a mobile terminal through a plurality of frequency bands. The base station includes communication means for communicating with a mobile terminal, and handover means for performing handover with at least one other base station. The communication means notifies, when communication through a plurality of frequency bands is allowed, the mobile terminal about information directed to identifying a main frequency band from the plurality of frequency bands in a manner allowing discrimination from one or more frequency bands other than the main frequency band.

According to still another aspect of the present invention, there is provided a mobile terminal adapted to perform communication with a base station through a plurality of frequency bands. The mobile terminal includes means for receiving, when communication through a plurality of frequency bands is allowed, information directed to identifying a main frequency band from the plurality of frequency bands, transmitted from the base station. The information directed to identifying the main frequency band is notified in a manner allowing discrimination from one or more frequency bands other than the main frequency band. The mobile terminal further includes means for determining, when information directed to identifying the main frequency band is received from a second base station during communication connection with a first base station, a frequency band identified by the information as a subject of handover to the second base station.

Advantageous Effects of Invention

According to the present invention, the handover operation to a base station that communicates through a plurality of frequency bands can be simplified.

BRIEF DESCRIPTION OF DRAWINGS

FIG. 2 schematically represents a concept of carrier aggregation.

DESCRIPTION OF EMBODIMENTS

Figure 1:
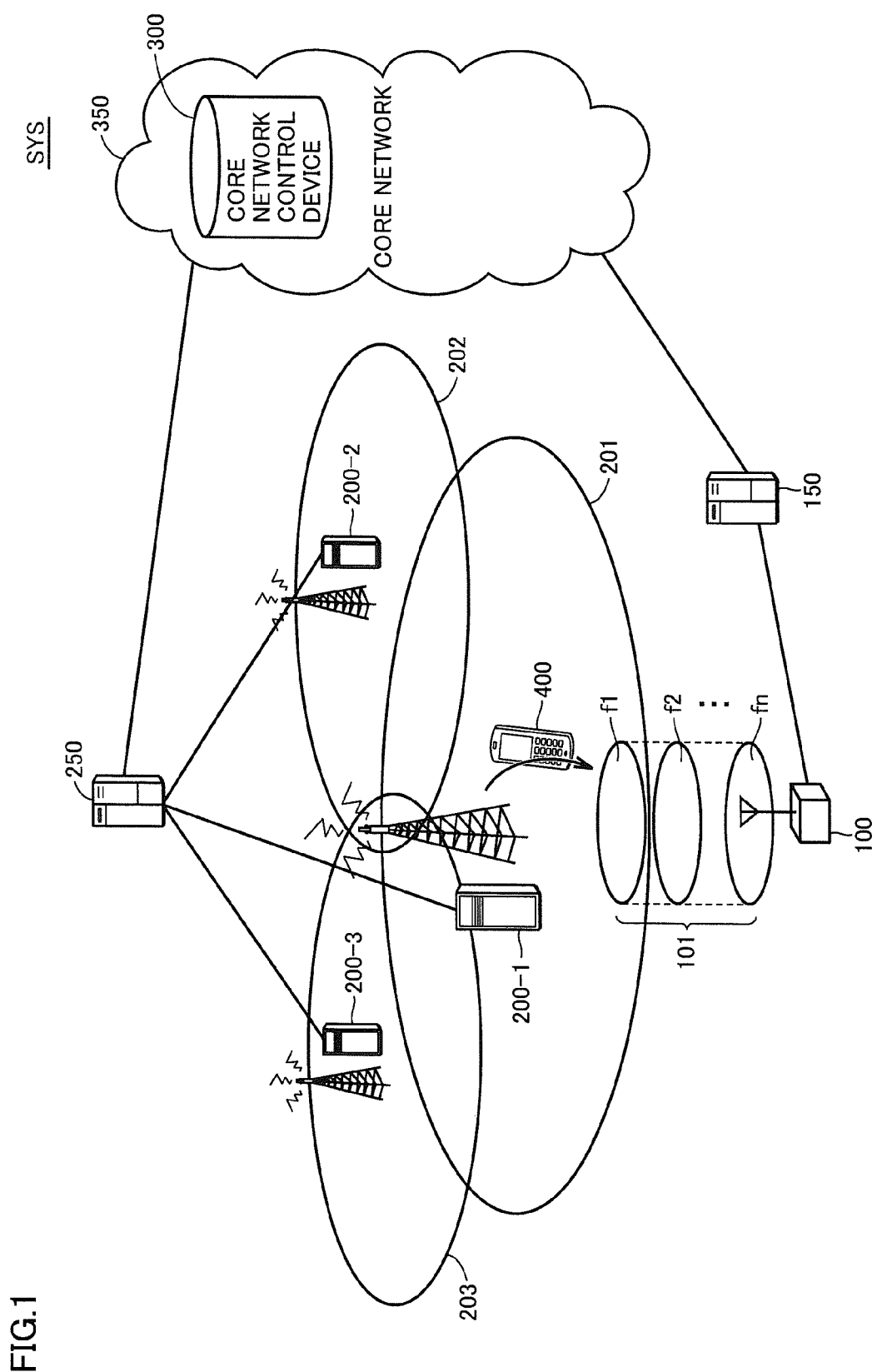
FIG. 1 schematically represents an overall configuration of a wireless communication system envisaged in an embodiment.

Embodiments of the present invention will be described in detail hereinafter with reference to the drawings. In the drawings, the same or corresponding elements have the same reference characters allotted, and description thereof will not be repeated.

A. Overall Configuration of Wireless Communication System

FIG. 1 schematically represents an overall configuration of a wireless communication system SYS envisaged in an embodiment. As a typical example, wireless communication system SYS is assumed to support a communication scheme according to the LTE specification or LTE-A specification.

Referring to FIG. 1, wireless communication system SYS includes evolved Node B (hereinafter, also referred to as "eNB") 200-1 to 200-3, and a small Home evolved node B (hereinafter, also referred to as "HeNB") 100. eNB and HeNB may generically be referred to simply as "base station". HeNB 100 covers a cell area 101C. eNBs 200-1 to 200-3 cover cell areas 201C to 203C, respectively. eNBs 200-1 to 200-3 may generically be referred to simply as "eNB 200". The number of eNBs and HeNBs is set appropriately according to the system.

As mentioned above, since introduction of a HeNB is considered for the purpose of enlarging the service area and for individual use or the like in the LTE/LTE-A specification, a cell area 101C provided by HeNB 100 is smaller than cell areas 201C-203C provided by eNBs 200-1 to 200-3. The cell provided by eNB 200 is referred to as a "macrocell" whereas the cell provided by HeNB 100 is referred to as a "home cell".

Each base station is connected to at least one gateway. Each gateway monitors a base station that is the connection target, and is connected to a core network 350 to build a wide area network. In core network 350, a core network control device 300 performs the routing and the like of a user packet. At least one (generally a plurality) base station is connected to each gateway. In the LTE/LTE-A specification, it is anticipated that core network 350 is a network where all information are set in packets.

It is assumed that HeNB 100 is connected to a gateway 150, and eNBs 200-1 to 200-3 are connected to a gateway 250. The number of gateways and the topologies are set appropriately according to the system. Gateways 150 and 250 include a MME (Mobility Management Entity) function. The MME function serves to control the setting/opening of a session (connection) for packet communication as well as handover (switching of base station).

Core network control device 300 includes a SAE gateway (System Architecture Evolution Gateway) function. The SAE gateway function serves to route a user packet on core network 350.

By employing such a configuration, communication between mobile terminals (User Equipment) 400 located at different cell areas is allowed.

Mobile terminal 400 is generally carried by a user, moving from cell to cell in accordance with the movement of the user. When such mobile terminals 400 are located in any cell areas, communication service can be received through a base station and corresponding gateway managing the relevant cell area. When a mobile terminal 400 moves from one cell area to another cell area, a handover operation is initiated. A handover operation may be initiated appropriately according to the status of the like of electric waves transferred between mobile terminal 400 and a base station.

B. Carrier Aggregation

It is assumed that HeNB 100 of wireless communication system SYS shown in FIG. 1 incorporates a carrier aggregation function.

FIG. 2 schematically represents the concept of carrier aggregation. Referring to FIG. 2, carrier aggregation is the technique to enlarge the maximum transmission bandwidth that can be supported. Typically, the maximum transmission bandwidth of the LTE specification (20 MHz by way of example) is enlarged up to 100 MHz. Specifically, a plurality of component carriers corresponding to the maximum transmission bandwidth of the LTE specification are used to carry out data transmission and reception with a mobile terminal.

Typically, as shown in FIG. 2 (A), a plurality of frequency bands each centered about a different frequency (f1, f2, ... f5) are set. A frequency band to be used for communication is selected from such frequency bands according to the status. In other words, HeNB 100 can selectively use at least one of a plurality of frequency bands to allow communicate with a mobile terminal.

The usage of such carrier aggregation technique allows backward compatibility with the LTE specification to be maintained.

It is to be noted that, depending upon the allocation status of electric waves to the country or district where wireless communication system SYS is operated, there may be the case where component carriers must be arranged discretely in a frequency region.

There is also the case where the carrier aggregation function is incorporated, not only at HeNB 100 shown in FIG. 1, but also at an eNB.

C. Overview of Problem and Solving Means

In carrier aggregation, each component carrier is handled as a logical cell. Specifically, from the standpoint of mobile terminal 400, a plurality of component carriers (frequency bands) are each recognized as a "cell".

In contrast, according to the current LTE/LTE-A specification, only one cell ID is to be used in the operation of a HeNB. Therefore, the same cell ID must be used between a plurality of component carriers in consideration of using carrier aggregation at HeNB 100.

Consider the case where mobile terminal 400 currently connected in communication with eNB 200-1 enters an area that allows communication with HeNB 100, such that handover to HeNB 100 is to be attempted.

However, when inbound handover is to be performed by mobile terminal 400 from eNB 200-1 that is such a macro cell base station to HeNB 100 that is the home cell base station, mobile terminal 400 cannot discriminate which component carrier (cell) the handover is to be performed by just the cell ID.

Figure 3:
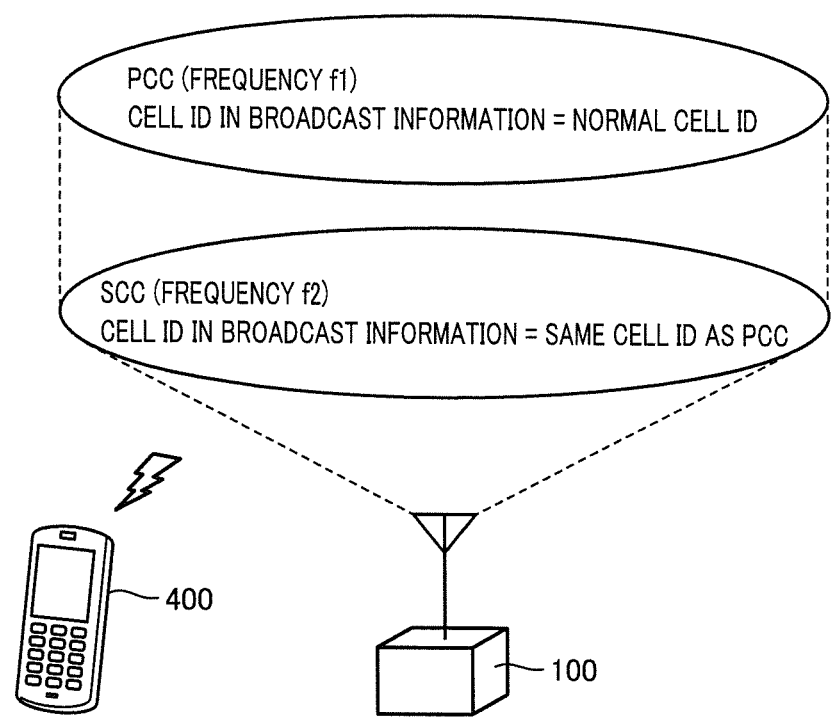
FIG. 3 is a schematic diagram to describe contents of broadcast information in carrier aggregation according to the current LTE/LTE-A specification.

Referring to FIG. 3, communication processing will be described in specific detail.

FIG. 3 is a schematic diagram to describe the contents of broadcast information in carrier aggregation according to the current LTE/LTE-A specification. Referring to FIG. 3, it is assumed that HeNB 100 is performing carrier aggregation using two component carriers, by way of example.

Component carriers used in carrier aggregation are constituted of one main frequency band (Primary Component Carrier: hereinafter, also referred to as "PCC"), and at least one sub frequency band (Secondary Component Carrier: hereinafter, also referred to as "SCC"). In the example of FIG. 3, it is assumed that HeNB 100 uses the PCC of frequency f1 and the SCC of frequency f2. Mobile terminal 400 can receive the component carrier transmitted by HeNB 100 (PCC and SCC) by performing different frequency measurement. HeNB 100 transmits broadcast information for every component carrier. According to the current LTE/LTE-A specification, the broadcast information transmitted for every component carrier from HeNB 100 will include the same cell ID. Therefore, when mobile terminal 400 performs inbound handover towards HeNB 100, a determination of which component carrier is to be shifted cannot be made by the cell ID.

In the first to third embodiments set forth below, the aforementioned problem encountered during inbound handover to HeNB 100 performing carrier aggregation is solved.

In brief, wireless communication system SYS according to the present embodiment includes a mobile terminal 400, and a plurality of base stations (HeNB 100 and eNB 200). Mobile terminal 400 can perform communication with an arbitrary base station through a plurality of frequency bands (component carriers). A base station includes communication means for communicating with mobile terminal 400, and handover means for performing handover with at least one other base station. In the case where communication (carrier aggregation) through a plurality of frequency bands (component carriers) is allowed, HeNB 100 notifies mobile terminal 400 about information directed to identifying the main frequency band (PCC) from the plurality of frequency bands in a manner that allows discrimination from one or more frequency bands (SCC) other than the main frequency band. When information to identify the main frequency band (PCC) is received from HeNB 100 during communication connection with eNB 200-1, mobile terminal 400 determines that the frequency band specified by the relevant information is the subject cell of handover to HeNB 100.

Examples of notifying information directed to identifying the main frequency band (PCC) from a plurality of frequency bands (component carriers) during operation of carrier aggregation in a manner that allows discrimination from one or more frequency bands (SCC) other than the main frequency band are set forth below.

(1) Transmit broadcast information including the original cell ID from the PCC while transmitting broadcast information including a dummy cell ID from a SCC.

(2) Transmit broadcast information including the original cell ID from the PCC while broadcast information from a SCC is not transmitted.

(3) Setting and transmitting a value generally used for the home cell as the physical cell ID (Physical Cell Identifier: hereinafter also referred to as "PCI") indicating a SCC while setting and transmitting a particular value reserved as a PCI indicating a SCC.

D. Configuration of Device

First, a hardware configuration of each entity constituting wireless communication system SYS shown in FIG. 1 will be described.

d1: Configuration of Base Station (HeNB 100)

Figure 4:
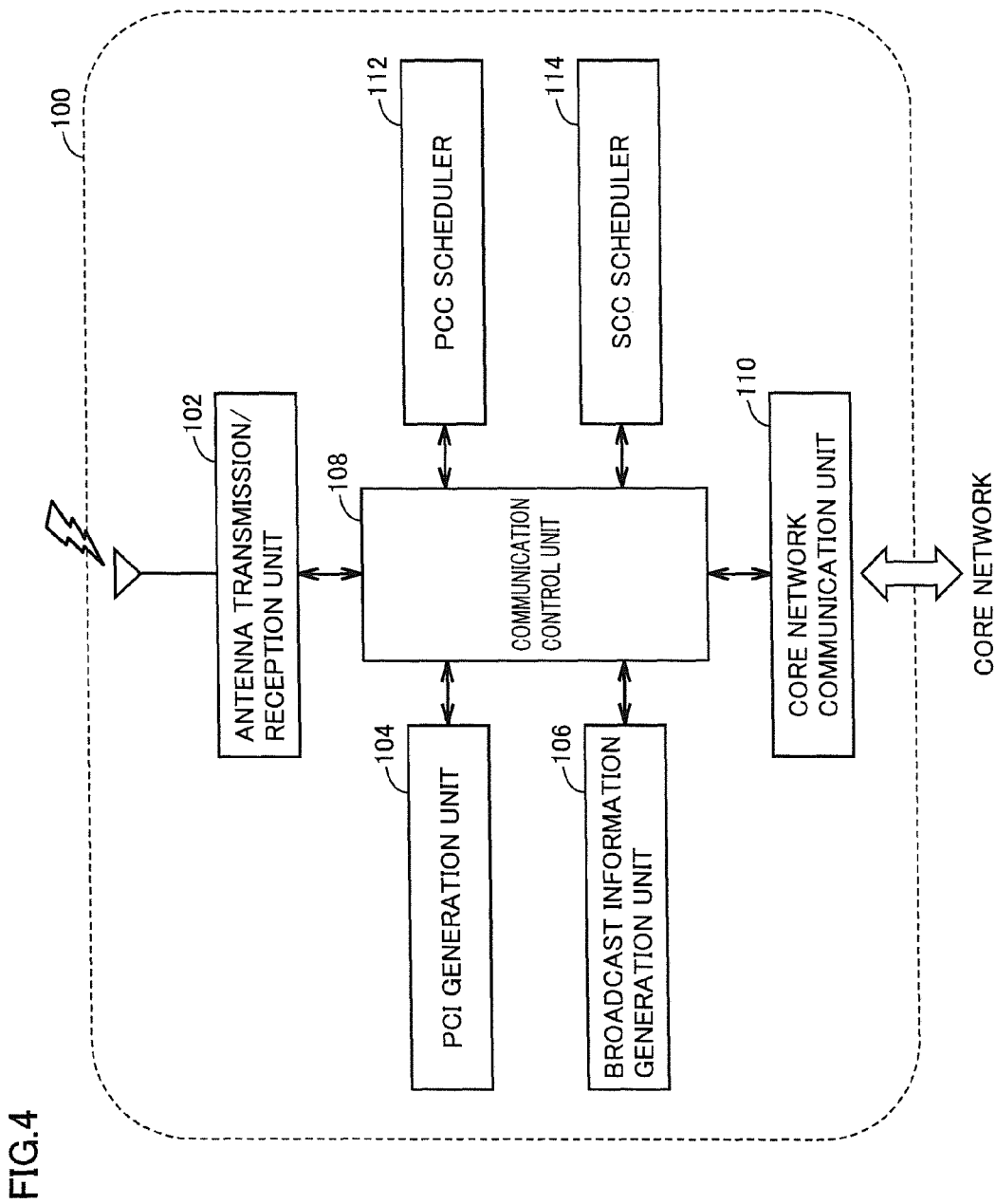
FIG. 4 is a block diagram representing a hardware configuration of a HeNB used in the wireless communication system shown in FIG. 1.

A configuration of base station (HeNB 100) used in wireless communication system SYS shown in FIG. 1 will be described. FIG. 4 is a block diagram representing a hardware configuration of HeNB 100 used in wireless communication system SYS shown in FIG. 1.

Referring to FIG. 4, HeNB 100 includes an antenna transmission/reception unit 102, a PCI generation unit 104, a broadcast information generation unit 106, a core network communication unit 110, a PCC scheduler 112, and a SCC scheduler 114.

Antenna transmission/reception unit 102 generates radio signals according to user data or control data received from communication control unit 108, and radiates the radio signals from the antenna. User data refers to data transferred between mobile terminal 400 and the other party (or, relay target). Antenna transmission/reception unit 102 demodulates the radio signals received from mobile terminal 400 through the antenna, and outputs the demodulated data to communication control unit 108. In other words, antenna transmission/reception unit 102 corresponds to communication means for communicating with mobile terminal 400.

PCI generation unit 104 generates a physical cell ID (PCI). More specifically, when HeNB 100 is performing carrier aggregation, PCI generation unit 104 generates a PCI for each component carrier. The generated PCI is used in the synchronizing signal for mobile terminal 400.

Broadcast information generation unit 106 generates broadcast information transmitted from each component carrier. Broadcast information includes a cell ID and the like representing a corresponding component carrier.

Communication control unit 108 is the main entity controlling the overall processing of HeNB 100, transmitting/receiving audio, data, and the like to/from mobile terminal 400 through antenna transmission/reception unit 102, and also transmitting/receiving audio, data, and the like to/from core network 350 through core network communication unit 110.

Communication control unit 108 also carries out processing related to handover with another base station (HeNB 100 and eNB 200). According to the LTE/LTE-A specification, two types of interfaces, i.e. S1 interface and X2 interface, are prepared. The S1 interface is directed to performing handover utilizing respective control channels between a base station and a corresponding gateway. The X2 interface is directed to performing handover by directly connecting base stations with each other in a pseudo manner, without the intervention of data processing at the core network. In the present embodiment, either interface may be employed. In other words, communication control unit 108 corresponds to handover means for performing handover with at least one other base station.

Core network communication unit 110 transmits/receives user data, control information, management information and the like to/from core network 350 (core network control device 300) through the gateway controlling the host station.

PCC scheduler 112 and SCC scheduler 114 appropriately assign the transmitted and received information to the time-frequency space used for communication with mobile terminal 400. Specifically, the transmission timing (time) and frequency (carrier) to be used for each information are specified in advance such that information can be transmitted more efficiently in a limited time-frequency space. PCC scheduler 112 performs scheduling of information at the time-frequency space provided by the PCC, whereas SCC scheduler 114 performs scheduling of information at the time-frequency space provided by the SCC.

Each of the functions constituting HeNB 100 shown in FIG. 4 may be implemented by a processor executing a program prestored in a non-volatile memory or the like. In this case, an operation device (processor) such as a CPU (Central Processing Unit) or DSP (Digital Signal Processor) will execute a set of instructions installed in advance.

Alternatively, a portion of or all of the functions shown in FIG. 4 may be implemented as dedicated hardware (typically, an integrated circuit). In this case, circuitry realizing all the functions may be implemented as one chip. Moreover, a SoC (System On a Chip) having components such as a processor, memory, controller for a peripheral device implemented as one chip may be employed.

d2: Configuration of Base Station (eNB 200)

Figure 5:
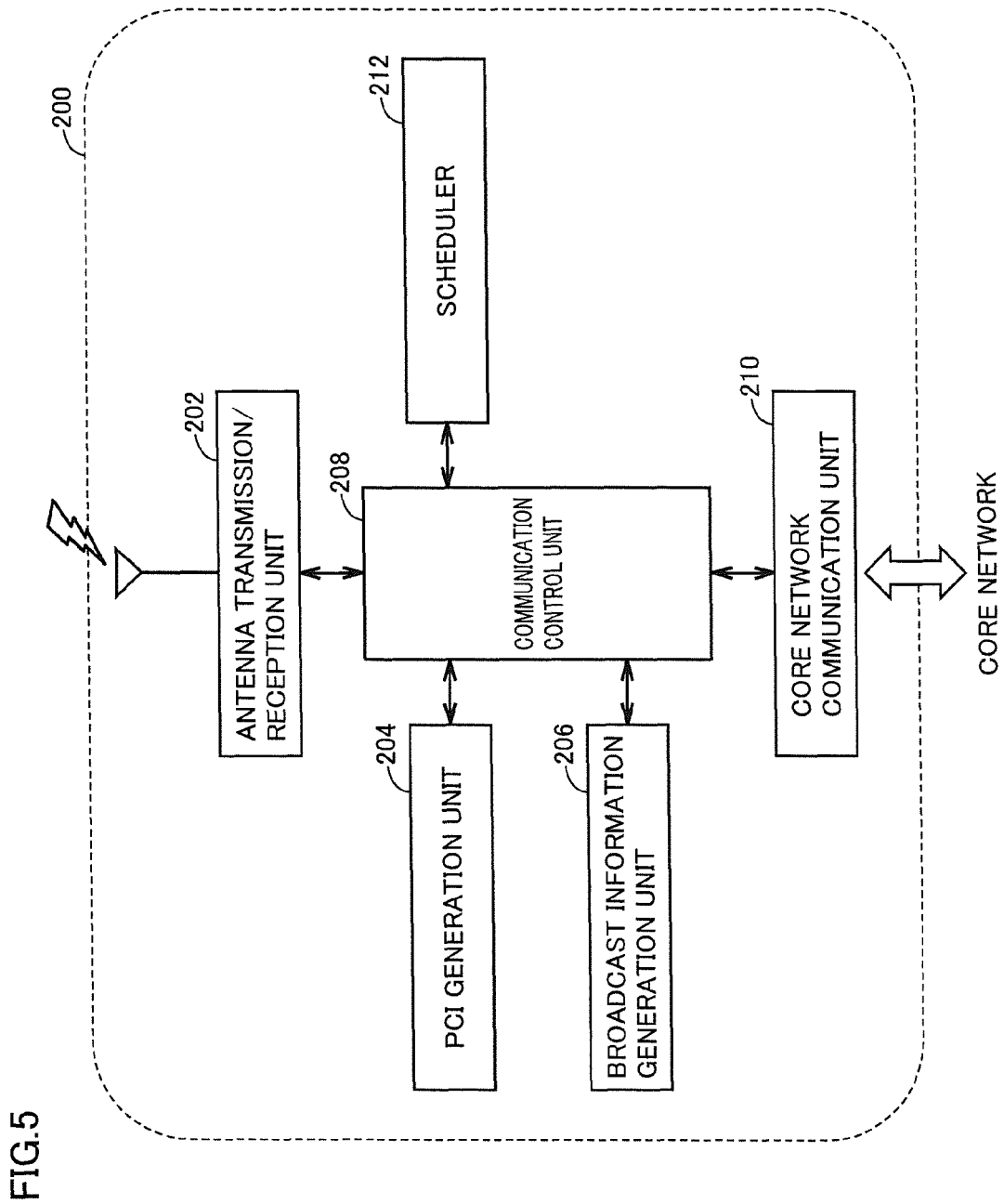
FIG. 5 is a block diagram representing a hardware configuration of an eNB used in the wireless communication system shown in FIG. 1.

A configuration of a base station (eNB 200) used in wireless communication system SYS of FIG. 1 will be described hereinafter. FIG. 5 is a block diagram representing a hardware configuration of eNB 200 used in wireless communication system SYS of FIG. 1.

Referring to FIG. 5, eNB 200 includes an antenna transmission/reception unit 202, a PCI generation unit 204, a broadcast information generation unit 206, a communication control unit 208, a core network communication unit 210, and a scheduler 212. The basic configuration of eNB 200 shown in FIG. 5 is similar to that of HeNB 100 shown in FIG. 4. In other words, antenna transmission/reception unit 202, PCI generation unit 204, broadcast information generation unit 206, communication control unit 208, and core network communication unit 210 provide functions similar to those of antenna transmission/reception unit 102, PCI generation unit 104, broadcast information generation unit 106, communication control unit 108, and core network communication unit 110, respectively. In the case where eNB 200 does not support carrier aggregation, a scheduler 212 is incorporated instead of PCC scheduler 112 and SCC scheduler 114.

Likewise with HeNB 100, the functions constituting eNB 200 shown in FIG. 5 may be implemented by software or hardware.

d3: Configuration of Core Network Control Device 300

Figure 6:
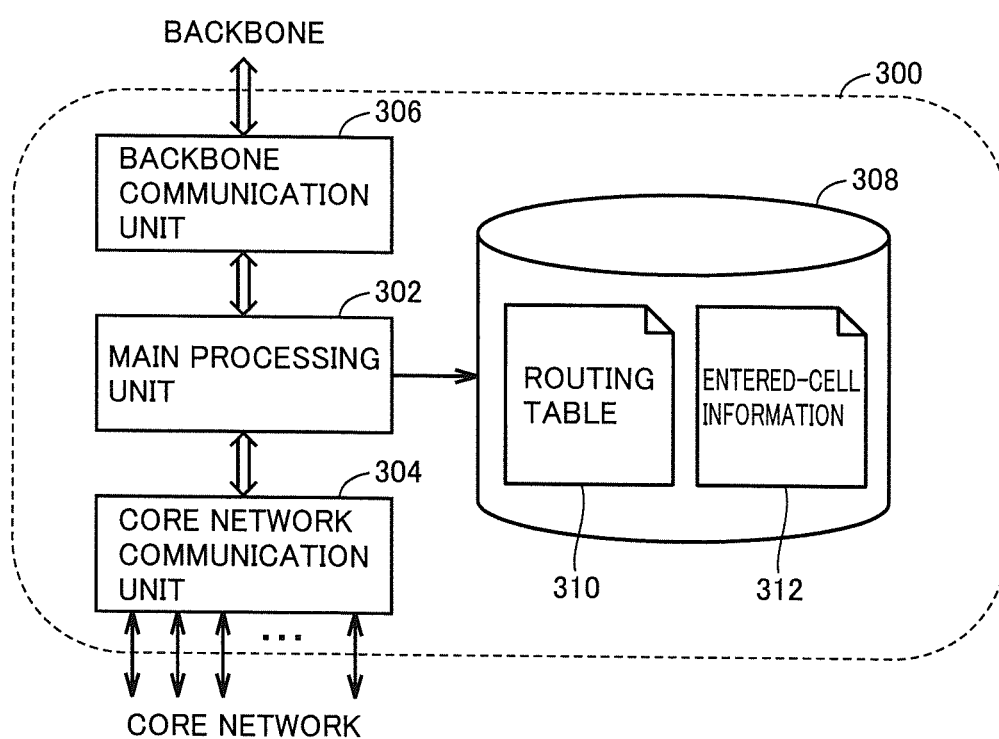
FIG. 6 is a block diagram representing a hardware configuration of a core network control device used in the wireless communication system shown in FIG. 1.

A configuration of core network control device 300 used in wireless communication system SYS of FIG. 1 will be described hereinafter. FIG. 6 is a block diagram representing a hardware configuration of core network control device 300 used in wireless communication system SYS shown in FIG. 1.

Referring to FIG. 6, core network control device 300 includes a main processing unit 302, a core network communication unit 304, a backbone communication unit 306, and a data storage unit 308.

Main processing unit 302 is an entity controlling the overall processing of core network control device 300, performing routing of a user packet in a core network.

Core network communication unit 304 transfers a user packet or the like transmitted from a base station through a gateway to a target base station.

Backbone communication unit 306 transmits data directed towards an external network from the data transmitted from a base station through a gateway to the backbone. Backbone communication unit 306 receives and outputs to main processing unit 302 data received from another device through the backbone and directed towards an arbitrary mobile terminal 400.

Data storage unit 308 stores routing table 310 and entered-cell information 312.

Routing table 310 includes the network information of the communication entity present on the core network and backbone. Upon receiving a packet addressed to a communication entity, main processing unit 302 refers to routing table 310 to identify a network path on which the relevant packet is to be transmitted towards the subject destination.

Entered-cell information 312 includes information of a cell area in which each mobile terminal 400 is located. Upon receiving a packet directed towards a particular mobile terminal 400, main processing unit 302 refers to entered-cell information 312 to identify a base station (cell) to which the relevant packet is to be transferred.

As will be described in the present embodiment afterwards, during operation of carrier aggregation, any packet addressed to a cell corresponding to the SCC performing communication with mobile terminal 400 is set so as to be transferred to the target cell corresponding to the PCC constituting a pair. In other words, core network control device 300 receives a request from a base station (HeNB 100) to perform routing suitable for carrier aggregation.

Likewise with the base station (HeNB 100 and eNB 200) set forth above, each of the functions constituting core network control device 300 shown in FIG. 6 may be implemented by either software or hardware.

d4: Configuration of Mobile Terminal 400

Figure 7:
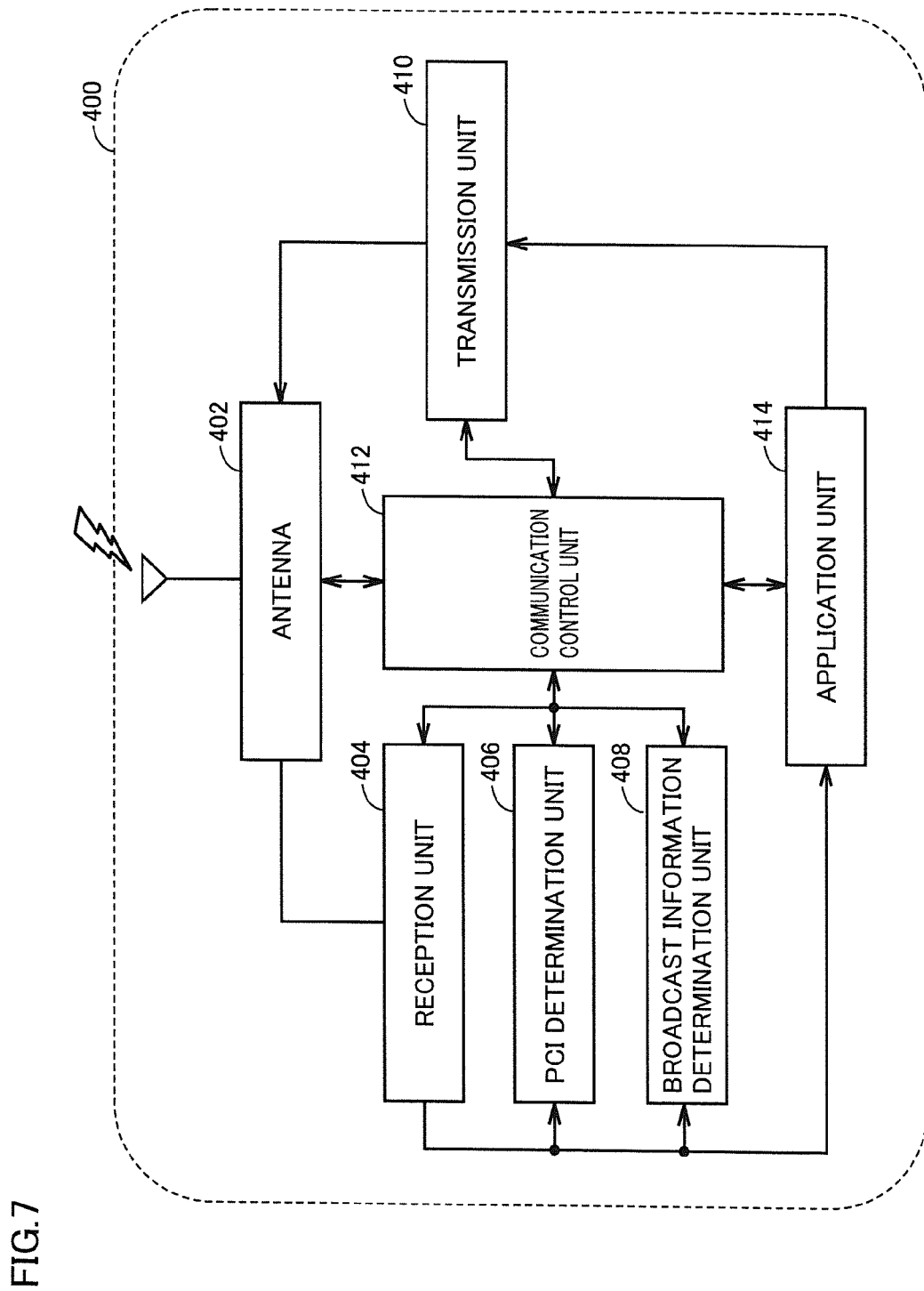
FIG. 7 is a block diagram representing a hardware configuration of a mobile terminal used in the wireless communication system shown in FIG. 1.

A configuration of mobile terminal 400 used in wireless communication system SYS shown in FIG. 1 will be described hereinafter. FIG. 7 is a block diagram representing a hardware configuration of mobile terminal 400 used in wireless communication system SYS shown in FIG. 1.

Referring to FIG. 7, mobile terminal 400 includes an antenna 402, a reception unit 404, a PCI determination unit 406, a broadcast information determination unit 408, a transmission unit 410, a communication control unit 412, and an application unit 414.

Reception unit 404 applies demodulation and decoding to a radio signal received through antenna 402, and outputs the resultant information to communication control unit 412, application unit 414, and the like. Transmission unit 410 applies coding and modulation to the information received from communication control unit 412 and application unit 414 to output the resultant radio signal from antenna 402.

Reception unit 404 and transmission unit 410 support communication using a plurality of component carriers (frequency band), and can transmit/receive radio signals concurrently through a plurality of frequency bands. In other words, antenna 402, reception unit 404 and transmission unit 410 correspond to communication means adapted to perform communication with a base station through a plurality of frequency bands.

PCI determination unit 406 determines the value of a physical cell ID (PCI) notified from a base station. PCI determination unit 406 functions mainly in the configuration of the third embodiment set forth below, and may be omitted in the configuration of the first embodiment and second embodiment.

Broadcast information determination unit 408 determines the contents of broadcast information notified from a base station. More specifically, broadcast information determination unit 408 identifies the cell ID included in the broadcast information transmitted from a base station.

Communication control unit 412 is the entity controlling the overall processing of mobile terminal 400, providing control of data transmission/reception with a base station, in addition to control during inbound handover towards HeNB 100 performing carrier aggregation that will be described afterwards.

Application unit 414 provides various application functions executed at mobile terminal 400.

Likewise with the base station (HeNB 100 and eNB 200) set forth above, each of the functions constituting mobile terminal 400 shown in FIG. 7 may be implemented by software or hardware.

Mobile terminal 400 includes the configuration of a mobile phone such as a display to show various information, a microphone to obtain the voice of a user and the like, a speaker to play the received voice, and an input unit to accept a user's manipulation.

E: First Embodiment e1: General

The first embodiment will be described based on a mode of using a cell ID as an example of notifying a mobile terminal 400 about information directed to identifying the main frequency band (PCC) among a plurality of frequency bands (component carriers) used in carrier aggregation, in a manner allowing discrimination from one or more frequency bands (SCC) other than the main frequency band.

Figure 8:
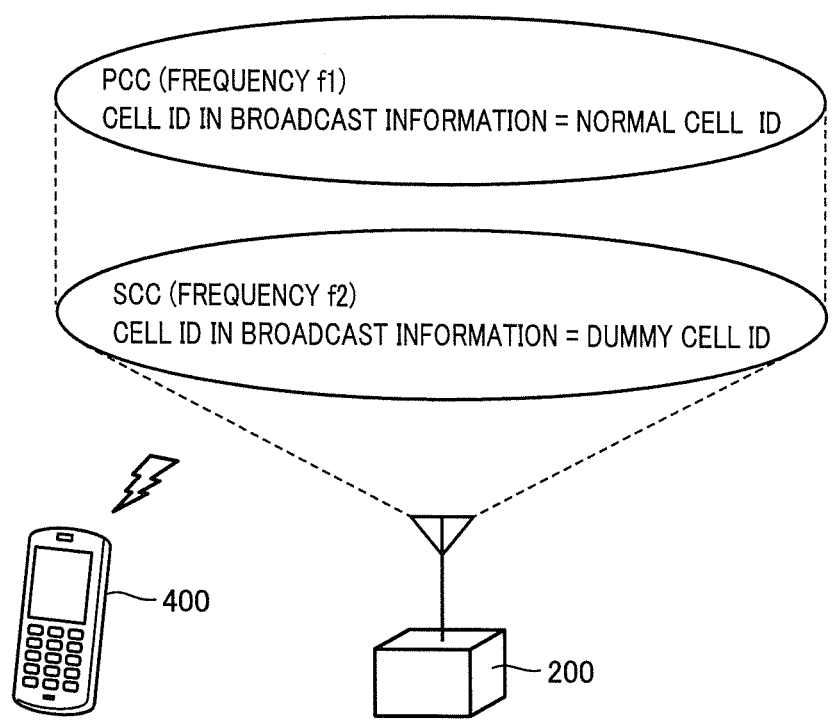
FIG. 8 is a schematic diagram to describe contents of broadcast information in carrier aggregation according to the first embodiment.

FIG. 8 is a schematic diagram to describe contents of broadcast information in carrier aggregation according to the first embodiment. As shown in FIG. 8, the first embodiment is directed to causing a normal cell ID to be included in the broadcast information transmitted from the PCC, and a dummy cell ID to be included in the broadcast information transmitted from the SCC. In other words, HeNB 100 transmits corresponding identification information through the main frequency band (PCC), and transmits invalid identification information through one or more frequency bands (SCC) other than the main frequency band.

Thus, broadcast information including the normal cell ID is transmitted from the PCC through its frequency band (frequency band f1), whereas broadcast information including a normal dummy cell ID is transmitted from the SCC through its frequency band (frequency f2). In other words, HeNB 100 transmits identification information corresponding to a frequency band, together in the broadcast information.

Mobile terminal 400 has a dummy cell ID stored in advance, and determines whether the cell ID included in the received broadcast information matches the dummy cell ID. For the dummy cell ID, a value not used as a normal cell ID such as "0000" or "FFFF" is set.

When the dummy cell ID is included in the received broadcast information, mobile terminal 400 determines that the component carrier (cell) that is the transmission source of the relevant broadcast information is the SCC, and does not take that component carrier as the subject cell of handover. In contrast, when the dummy cell ID is not included in the received broadcast information, mobile terminal 400 determines that the component carrier (cell) that is the transmission source of the relevant broadcast information is the PCC, and takes that component carrier as the subject cell of handover.

Thus, when a component carrier that is the subject of handover is determined, mobile terminal 400 initiates a handover preparation procedure with a base station (HeNB 100) managing the relevant component carrier (cell). This handover preparation procedure includes a process such as "measurement" collecting information required to execute handover such as a channel quality notification (CQI: Channel Quality Indicator).

At this stage, for the purpose of avoiding occurrence of routing data towards the SCC, the base station (HeNB 100) requests core network control device 300 to route to the PCC the data that has been requested to be routed to the SCC through core network 350. When carrier aggregation is established between mobile terminal 400 and HeNB 100 subsequent to handover completion, the base station (HeNB 100) schedules the data addressed to the cell ID of the PCC to the PCC and SCC.

Specifically, HeNB 100 notifies core network 350 that is an upper network to transfer data directed to a cell associated with a frequency band (SCC) other than the main frequency band (PCC) to the cell associated with the main frequency band. Then, HeNB 100 transmits the data addressed to the cell associated with the main frequency band, received from core network 350, to mobile terminal 400 through the main frequency band and through one or more frequency bands other than the main frequency band.

By such processing, higher speed communication through a plurality of frequency bands (component carriers) is allowed between mobile terminal 400 and HeNB 100.

e2: Processing Sequence

Figure 9:
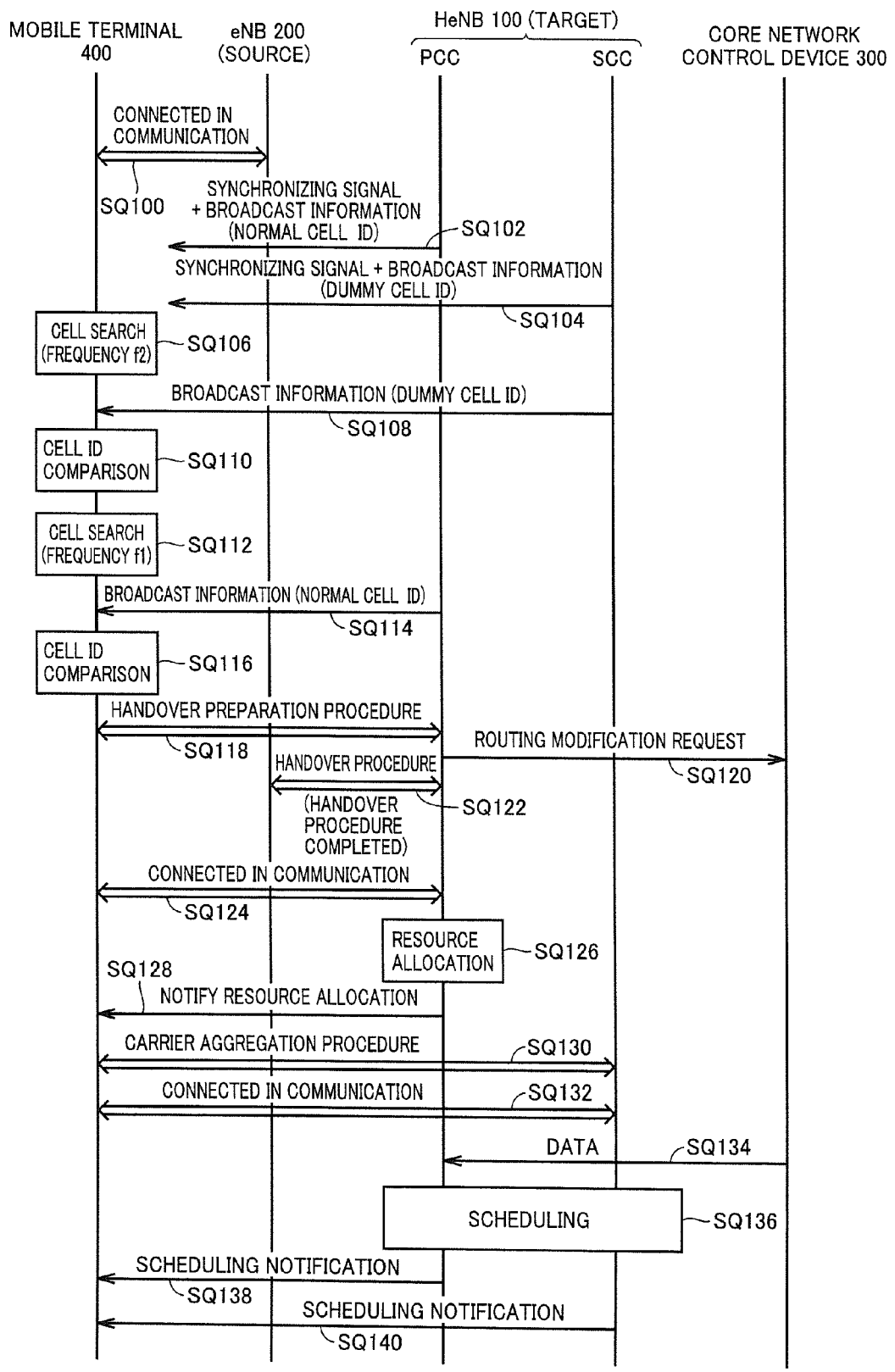
FIG. 9 is a sequence chart representing a handover operation at the wireless communication system according to the first embodiment.

The processing sequence according to the first embodiment will be described with reference to FIG. 9. FIG. 9 is a sequence chart representing a handover operation at wireless communication system SYS of the first embodiment.

Referring to FIG. 9, it is assumed that mobile terminal 400 is currently connected in communication with eNB 200 (for example, eNB 200-1 shown in FIG. 1), as a state of a particular time in point, as shown in FIG. 1 (sequence SQ100). Here, eNB 200 is the source base station of the handover operation whereas HeNB 100 is the target base station of the handover operation.

It is assumed that HeNB 100 adjacent to eNB 200-1 is performing carrier aggregation using the PCC (frequency f1) and one SCC (frequency f1). HeNB 100 transmits a synchronizing signal including the PCI generated at PCI generation unit 104, and broadcast information including a normal cell ID generated at broadcast information generation unit 106, from antenna transmission/reception unit 102 through the PCC (sequence SQ102). Moreover, HeNB 100 transmits a synchronizing signal including the PCI generated at PCI generation unit 104, and broadcast information including a dummy cell ID generated at broadcast information generation unit 106, from antenna transmission/reception unit 102 through the SCC (sequence SQ104). The transmission timing of the synchronizing signal and broadcast information can be set arbitrarily with each other.

Thus, HeNB 100 notifies mobile terminal 400, when communication (carrier aggregation) through a plurality of frequency bands (component carriers) is allowed, about information directed to identifying the main frequency band (PCC) from the relevant frequency bands in a manner allowing discrimination from one or more frequency bands (SCC) other than the main frequency band.

It is assumed that mobile terminal 400 prestores a dummy cell ID to be used by HeNB 100 so as to allow determination of a cell ID at broadcast information determination unit 408.

When mobile terminal 400 approaches the cell area of HeNB 100, a synchronizing signal transmitted from HeNB 100 can be received. Mobile terminal 400 determines periodically or at every event whether any synchronizing signal can be received or not.

Here, it is assumed that mobile terminal 400 performs a cell search for frequency f2 in the cell area provided by HeNB 100 (sequence SQ106). Mobile terminal 400 receives a synchronizing signal from the component carrier of frequency f2 (here, the SCC), and receives the broadcast information transmitted through that SCC (sequence SQ108).

Broadcast information determination unit 408 of mobile terminal 400 extracts a value of the cell ID (dummy cell ID) included in the broadcast information received from the SCC, and compares it with a prestored dummy cell ID to determine whether they match or not (sequence SQ110). When the cell ID included in the received broadcast information matches the dummy cell ID, mobile terminal 400 determines that the component carrier corresponding to the received broadcast information is the SCC, concluding that it is not the subject cell of handover.

Concurrently with the process set forth above, or subsequent to the process set forth above, it is assumed that mobile terminal 400 performs a cell search for frequency f1 in the cell area provided by HeNB 100 (sequence SQ112). Mobile terminal 400 receives a synchronizing signal from the component carrier of frequency f1 (here, the PCC), and receives the broadcast information transmitted through the PCC (sequence SQ114).

Broadcast information determination unit 408 of mobile terminal 400 extracts a value of the cell ID (normal cell ID) included in the broadcast information received from the PCC, and compares it with the prestored dummy cell ID to determine whether they match or not (sequence SQ116). When the cell ID included in the received broadcast information does not match the dummy cell ID, mobile terminal 400 determines that the component carrier corresponding to the received broadcast information is the PCC, concluding that it is the subject cell of handover.

Mobile terminal 400 identifies the component carrier (cell) that is the subject of handover based on whether the cell ID included in the broadcast information matches the dummy cell ID, and initiates a handover preparation procedure with the identified component carrier (cell) that is the subject of handover (sequence SQ118). Specifically, when information directed to identifying the main frequency band (PCC) is received from HeNB 100 during communication connection with eNB 200, mobile terminal 400 determines that the frequency band identified by the relevant information is the subject of handover towards HeNB 100.

HeNB 100 to which a handover preparation has been requested by mobile terminal 400 requests core network control device 300 to modify routing such that the data requested to be routed to the SCC through the core network is routed to the PCC (sequence SQ120). This is for the purpose of avoiding data to be routed to a SCC that is not the subject cell for handover at the current stage. Specifically, HeNB 100 requests the data towards mobile terminal 400 to be routed to the normal cell ID assigned to the PCC.

In response to the request using the frequency band (PCC) identified by mobile terminal 400, handover is executed between eNB 200 and HeNB 100. When the handover procedure between eNB 200 that is the source base station and HeNB 100 that is the target base station is completed (sequence SQ122), the handover by mobile terminal 400 to the PCC (cell) provided by HeNB 100 is completed. Accordingly, mobile terminal 400 first performs communication with HeNB 100 by the PCC. In other words, mobile terminal 400 attains a currently connected state of communication with the PCC of eNB 200 (sequence SQ124).

Then, HeNB 100 performs scheduling such that mobile terminal 400 can utilize carrier aggregation. In other words, PCC scheduler 112 and SCC scheduler 114 of HeNB 100 allocates an arbitrary resource included in the PCC and SCC to mobile terminal 400 (sequence SQ126). Then, HeNB 100 notifies mobile terminal 400 about the resource allocated result through the PCC (sequence SQ128).

In the case where the resource allocated at sequence SQ128 includes a SCC, mobile terminal 400 detects that HeNB 100 provides a SCC in addition to the PCC, and establishes carrier aggregation with HeNB 100. In other words, mobile terminal 400 performs a carrier aggregation procedure to the SCC provided by HeNB 100, and takes SCC as the communication subject in addition to the PCC (sequence SQ130). Mobile terminal 400 is currently connected in communication with the SCC of eNB 200 (sequence SQ132). In other words, mobile terminal 400 communicates with HeNB 100 through a plurality of frequency bands (component carriers).

Then, when any data routed based on a normal cell ID is received from core network control device 300 (core network 350), HeNB 100 performs scheduling towards the resource included in the PCC and SCC (sequence SQ136). Specifically, PCC scheduler 112 and SCC scheduler 114 of HeNB 100 schedule the data to be transmitted to mobile terminal 400 to an arbitrary resource allocated by itself and included in the PCC and SCC corresponding to mobile terminal 400. Then, HeNB 100 notifies mobile terminal 400 about the scheduling result (sequence SQ138 and SQ140).

Thus, mobile terminal 400 performs communication with HeNB 100 through the PCC and SCC.

e3: Process Flow

Figure 10:
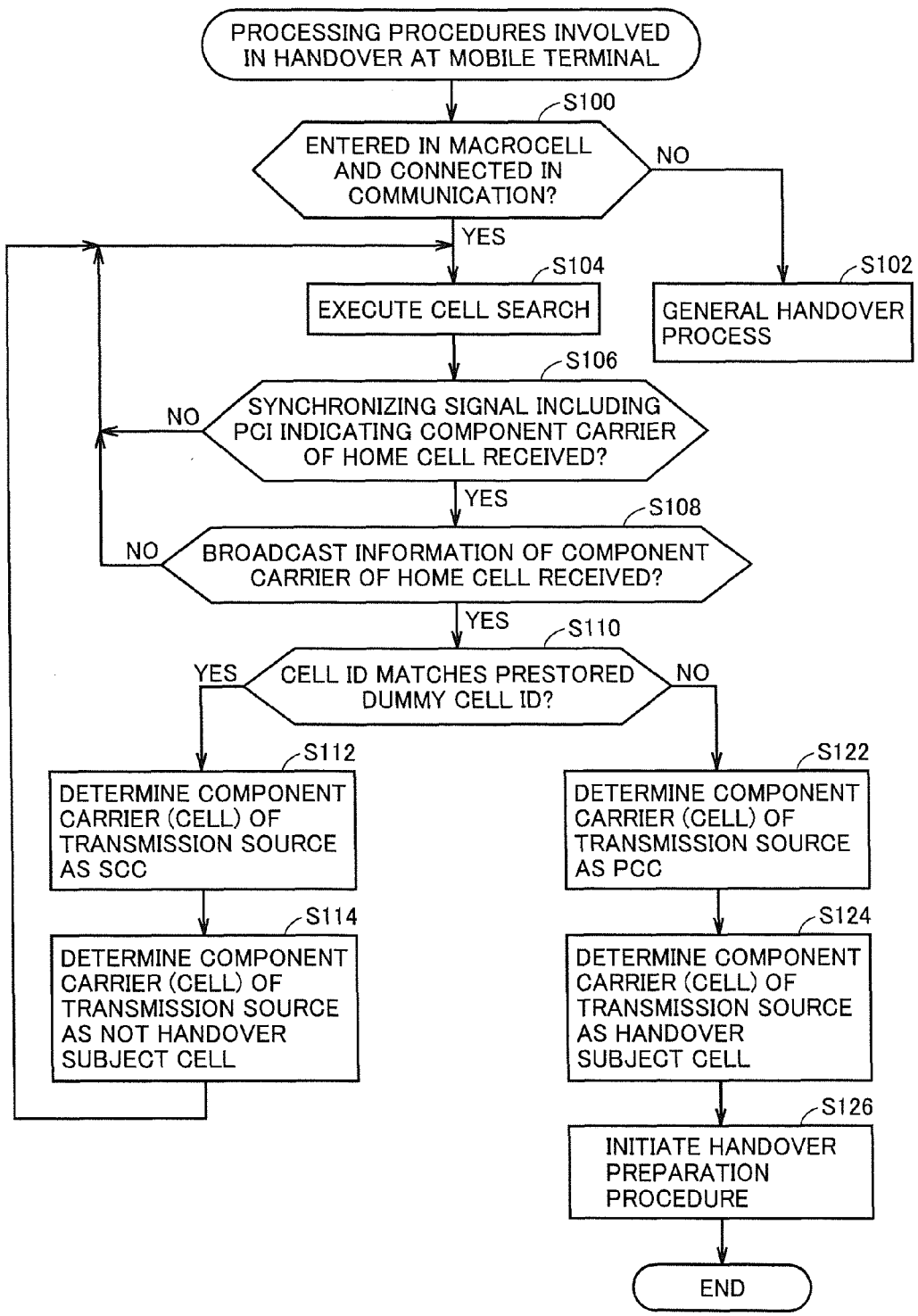
FIG. 10 is a flowchart representing processing procedures involved in handover at a mobile terminal in the wireless communication system according to the first embodiment.

A process flow at mobile terminal 400 according to the first embodiment will be described with reference to FIG. 10. FIG. 10 is a flowchart representing the processing procedures associated with handover at mobile terminal 400 of wireless communication system SYS according to first embodiment.

First, mobile terminal 400 determines whether it is located in a macrocell, and currently connected in communication or not (step S100). In the case where it is not located in a macrocell, and not currently connected in communication (NO at step S100), a general handover process is executed (step S102).

When located in a macrocell and currently connected in communication (YES at step S100), mobile terminal 400 executes a cell search (step S104). Then, mobile terminal 400 determines whether a synchronizing signal including the PCI indicating the component carrier of the home cell is received or not (step S106). In the case where a synchronizing signal containing the PCI indicating the component carrier of the home cell is not received (NO at step S106), the process of steps S104 and et seq. is executed again.

When a synchronizing signal including a PCI indicating the component carrier of the home cell is received (YES at step S106), mobile terminal 400 determines whether the broadcast information of a component carrier of the home cell has been received or not (step S108). In the case where the broadcast information of the carrier component of the home cell is not received (NO at step S108), the process of steps S104 and et seq. is executed again.

In the case where broadcast information of a component carrier of the home cell is received (YES at step S106), mobile terminal 400 extracts the cell ID included in the received broadcast information, and determines whether the extracted cell ID matches the prestored dummy cell ID (step S110).

In the case where the cell ID included in the broadcast information matches the prestored dummy cell ID (YES at step S110), mobile terminal 400 determines that the component carrier (cell) of the transmission source of the relevant broadcast information is the SCC (step S112). Then, mobile terminal 400 determines that the component carrier (cell) of the transmission source of the relevant broadcast information is not the subject cell of handover (step S114). Then, the process of steps S104 and et seq. is executed again.

In contrast, in the case where the cell ID included in the broadcast information does not match the prestored dummy cell ID (NO at step S110), mobile terminal 400 determines that the component carrier (cell) of the transmission source of the relevant broadcast information is the PCC (step S122).

Then, mobile terminal 400 determines that the component carrier (cell) of the transmission source of the relevant broadcast information is the subject cell of handover (step S124). Then, mobile terminal 400 initiates a handover preparation procedure with HeNB 100 for the component carrier (cell) determined to be the subject cell of handover (step S126). Then, upon completion of the inbound handover to HeNB 100, the process ends.

e4: Advantage

According to the first embodiment, mobile terminal 400 receives broadcast information including a cell ID differing from each other when the PCC and SCC are each measured through a cell search. Accordingly, mobile terminal 400 can identify a component carrier differing in nature. Since broadcast information including a dummy cell ID is transmitted from the SCC, mobile terminal 400 can identify the component carrier (cell) that is the subject of handover based on whether broadcast information including the dummy cell ID is received or not, even in the case where a plurality of component carriers are provided.

In other words, when the cell ID included in the received broadcast information matches the prestored dummy cell ID, the component carrier through which the relevant broadcast information was transmitted can be removed from the subject cell of handover. Accordingly, any SCC not qualified as the handover target can be removed, and only the PCC can be identified as the subject cell of handover. Since only the PCC can be narrowed down to the subject of handover, the handover preparation procedure such as measurement towards the handover target can be simplified. As a result, the inbound handover from a macrocell to the home cell can be performed in a shorter period of time. Moreover, power consumption at mobile terminal 400 can be reduced.

F: Second Embodiment f1: General

The second embodiment will be described based on a mode of using invalid broadcast information as an example of notifying a mobile terminal 400 about information directed to identifying the main frequency band (PCC) from a plurality of frequency bands (component carriers) used in carrier aggregation, in a manner allowing discrimination from one or more frequency bands (SCC) other than the main frequency band.

Figure 11:
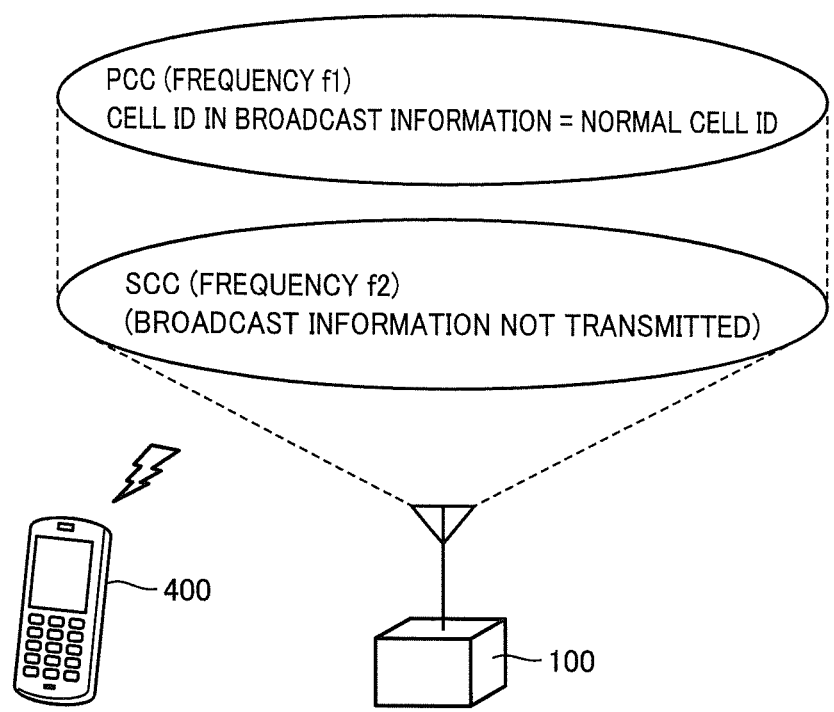
FIG. 11 is a schematic diagram to describe contents of broadcast information in carrier aggregation according to a second embodiment.

FIG. 11 is a schematic diagram to describe contents of broadcast information during carrier aggregation according to the second embodiment. As shown in FIG. 11, broadcast information including a (normal) cell ID is transmitted from the PCC whereas valid broadcast information is not to be transmitted from a SCC in the second embodiment. "Not transmitting valid broadcast information" includes the case of transmitting broadcast information set to an invalid value (null value), in addition to the case where no broadcast information is transmitted.

Thus, HeNB 100 transmits corresponding identification information through the main frequency band (PCC), and does not transmit identification information through the one or more frequency bands (SCC) other than the main frequency band. In other words, broadcast information including a cell ID is transmitted from the PCC through its frequency band (frequency f1), and broadcast information of the relevant frequency band (frequency f2) is not transmitted from a SCC.

Mobile terminal 400 determines whether valid broadcast information can be received or not. When valid broadcast information cannot be received, mobile terminal 400 determines that the component carrier (cell) from which the relevant broadcast information was transmitted is the SCC, and does not take that component carrier as the subject cell of handover. In contrast, when valid broadcast information was received, mobile terminal 400 determines that the component carrier (cell) from which the relevant broadcast information was transmitted is the PCC, and takes that component carrier as the subject cell of handover. According to the LTE/LTE-A specification, mobile terminal 400 recognizes the component carrier (cell) from which the relevant broadcast information was transmitted to be a "barred cell" when valid broadcast information was not received.

When a component carrier that is the handover subject is determined, mobile terminal 400 initiates a handover preparation procedure with a base station (HeNB 100) that monitors the relevant component carrier (cell).

At this stage, the base station (HeNB 100) requests core network control device 300 to route to the PCC the data requested to be routed to a SCC through core network 350 in order to avoid occurrence of data being routed towards a SCC. When carrier aggregation between mobile terminal 400 and HeNB 100 is established following handover completion, the base station (HeNB 100) schedules the data addressed to the cell ID of the PCC towards the PCC and SCC.

Specifically, HeNB 100 notifies core network 350 that is the upper network to transmit data directed to a cell associated with a frequency band (SCC) other than the main frequency (PCC) to the cell associated with the main frequency band. Then, HeNB 100 transmits the data addressed to the cell associated with the main frequency band, received from core network 350, to mobile terminal 400 using the main frequency band and the one or more frequency bands other than the main frequency band.

By such a process, higher speed communication through a plurality of frequency bands (component carriers) is allowed between mobile terminal 400 and HeNB 100.

f2: Process Sequence

Figure 12:
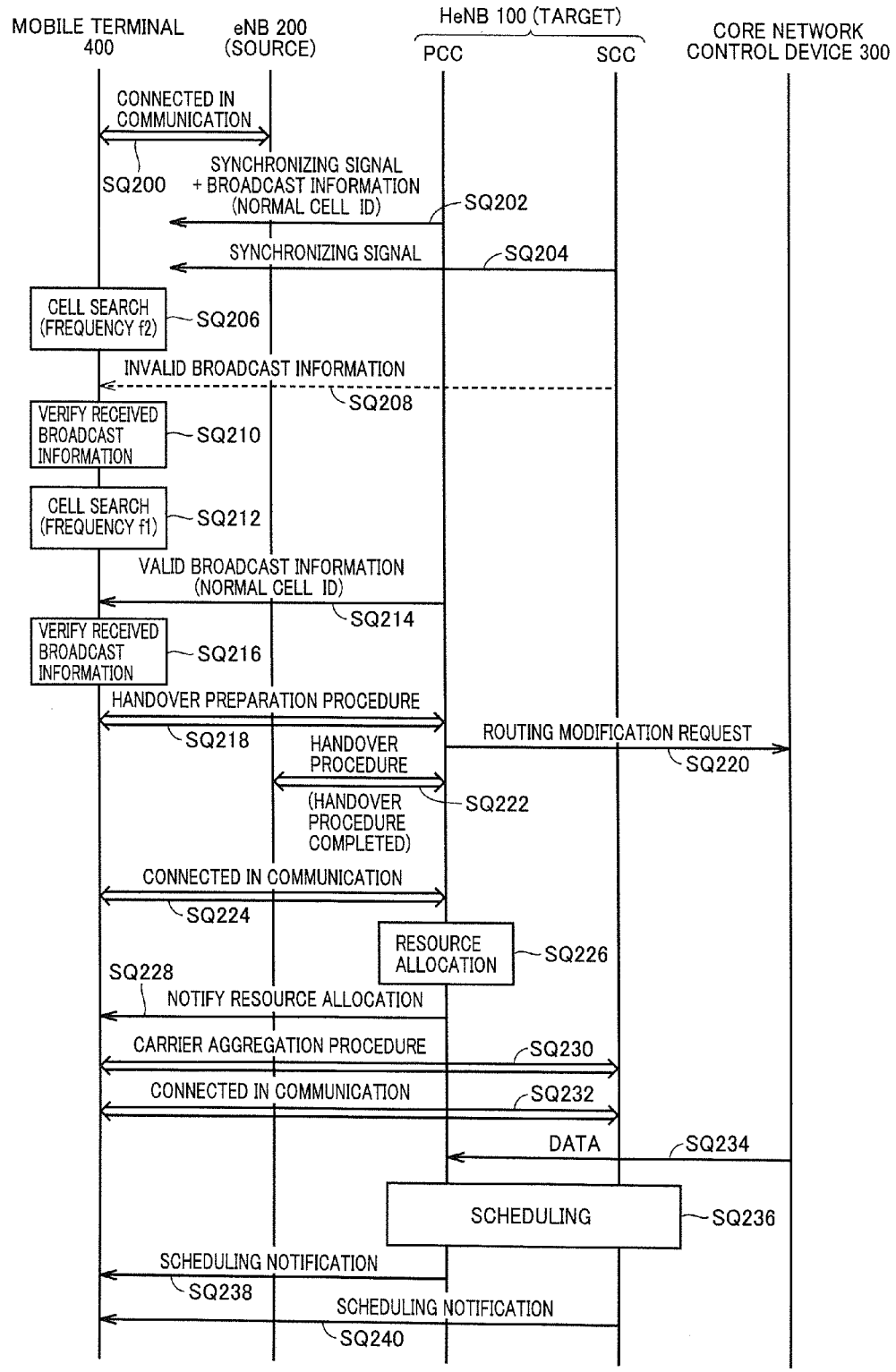
FIG. 12 is a sequence chart representing a handover operation at a wireless communication system according to the second embodiment.

Process sequences according to the second embodiment will be described hereinafter with reference to FIG. 12. FIG. 12 is a sequence chart representing a handover operation at wireless communication system SYS according to the second embodiment.

Referring to FIG. 12, it is assumed that mobile terminal 400 is currently connected in communication with eNB 200 (for example, eNB 200-1 shown in FIG. 1) as the state of the current point in time, as shown in FIG. 1 (sequence SQ200). Here, it is assumed that eNB 200-1 is the source base station of the handover operation whereas HeNB 100 is the target base station of the handover operation.

It is assumed that HeNB 100 adjacent to eNB 200-1 is performing carrier aggregation using the PCC (frequency f1) and one SCC (frequency f1). HeNB 100 transmits a synchronizing signal including the PCI generated at PCI generation unit 104, and broadcast information including a normal cell ID generated at broadcast information generation unit 106, from antenna transmission/reception unit 102 through the PCC (sequence SQ202). Moreover, HeNB 100 transmits a synchronizing signal including the PCI generated at PCI generation unit 104, from antenna transmission/reception unit 102 through the SCC (sequence SQ204). The transmission timing of the synchronizing signal and broadcast information can be set arbitrarily with each other.

It is assumed that mobile terminal 400 prestores broadcast information that is to be used by HeNB 100 and not valid, or invalid broadcast information, so as to allow determination of a cell ID at broadcast information determination unit 408.

When mobile terminal 400 approaches the cell area of HeNB 100, a synchronizing signal transmitted from HeNB 100 can be received. Mobile terminal 400 determines periodically or at every event whether any synchronizing signal can be received or not.

Here, it is assumed that mobile terminal 400 performs a cell search for frequency f2 in the cell area provided by HeNB 100 (sequence SQ206). Mobile terminal 400 receives a synchronizing signal from the component carrier of frequency f2 (here, the SCC), but cannot receive valid broadcast information transmitted through that SCC (sequence SQ208).

Broadcast information determination unit 408 of mobile terminal 400 verifies the broadcast information received from the SCC, and determines whether valid broadcast information has been received or not (sequence SQ210). When a determination is made of receiving valid broadcast information, mobile terminal 400 determines that the corresponding component carrier is the SCC, concluding that it is not the subject cell of handover.

Concurrently with or subsequent to the process set forth above, it is assumed that mobile terminal 400 performs a cell search for frequency f1 in the cell area provided by HeNB 100 (sequence SQ212). Mobile terminal 400 receives a synchronizing signal from the component carrier of frequency f1 (here, the PCC), and receives broadcast information transmitted through the PCC (sequence SQ214).

Broadcast information determination unit 408 of mobile terminal 400 verifies the broadcast information received from the PCC, and determines whether valid broadcast information has been received or not (sequence SQ216). When a determination is made of receiving valid broadcast information, mobile terminal 400 determines that the corresponding component carrier is the PCC, concluding that it is the subject cell of handover.

Mobile terminal 400 identifies the component carrier (cell) that is the subject of handover based on whether valid broadcast information has been received or not, as set forth above, and initiates a handover preparation procedure with the identified component carrier (cell) that is the subject of handover (sequence SQ218).

HeNB 100 receiving a handover preparation request from mobile terminal 400 requests core network control device 300 for routing modification such that the data requested to be routed to the SCC through the core network is routed to the PCC (sequence SQ220). This is for the purpose of avoiding data to be routed to a SCC that is not the subject cell for handover at the current stage. Specifically, HeNB 100 requests routing such that data towards mobile terminal 400 is to be routed to the normal cell ID assigned to the PCC.

When the handover procedure between eNB 200 that is the source base station and HeNB 100 that is the target base station is completed (sequence SQ222), the handover by mobile terminal 400 to the PCC (cell) provided by HeNB 100 is completed. Accordingly, mobile terminal 400 first performs communication with HeNB 100 through the PCC. In other words, mobile terminal 400 attains a currently connected state of communication with the PCC of eNB 200 (sequence SQ224).

Then, HeNB 100 performs scheduling such that mobile terminal 400 can utilize carrier aggregation. In other words, PCC scheduler 112 and SCC scheduler 114 of HeNB 100 allocates an arbitrary resource in the PCC and SCC to mobile terminal 400 (sequence SQ226). Then, HeNB 100 notifies mobile terminal 400 about the resource allocated result through the PCC (sequence SQ228).

In the case where the resource allocated at sequence SQ128 includes a SCC, mobile terminal 400 detects that HeNB 100 provides a SCC in addition to the PCC, and establishes carrier aggregation with HeNB 100. In other words, mobile terminal 400 performs a carrier aggregation procedure with respect to the SCC provided by HeNB 100, and takes SCC as the communication subject in addition to the PCC (sequence SQ230). By this carrier aggregation procedure, mobile terminal 400 is currently connected in communication with the SCC of eNB 200 (sequence SQ232).

Then, when any data routed based on a normal cell ID is received from core network control device 300 (core network 350), HeNB 100 performs scheduling towards the resource in the PCC and SCC (sequence SQ236). Specifically, PCC scheduler 112 and SCC scheduler 114 of HeNB 100 schedule the data to be transmitted to mobile terminal 400 to an arbitrary resource allocated by itself and in the PCC and SCC corresponding to mobile terminal 400. Then, HeNB 100 notifies mobile terminal 400 about the scheduling result (sequences SQ238 and SQ240).

Thus, mobile terminal 400 performs communication with HeNB 100 through the PCC and SCC.

f3: Process Flow

Figure 13:
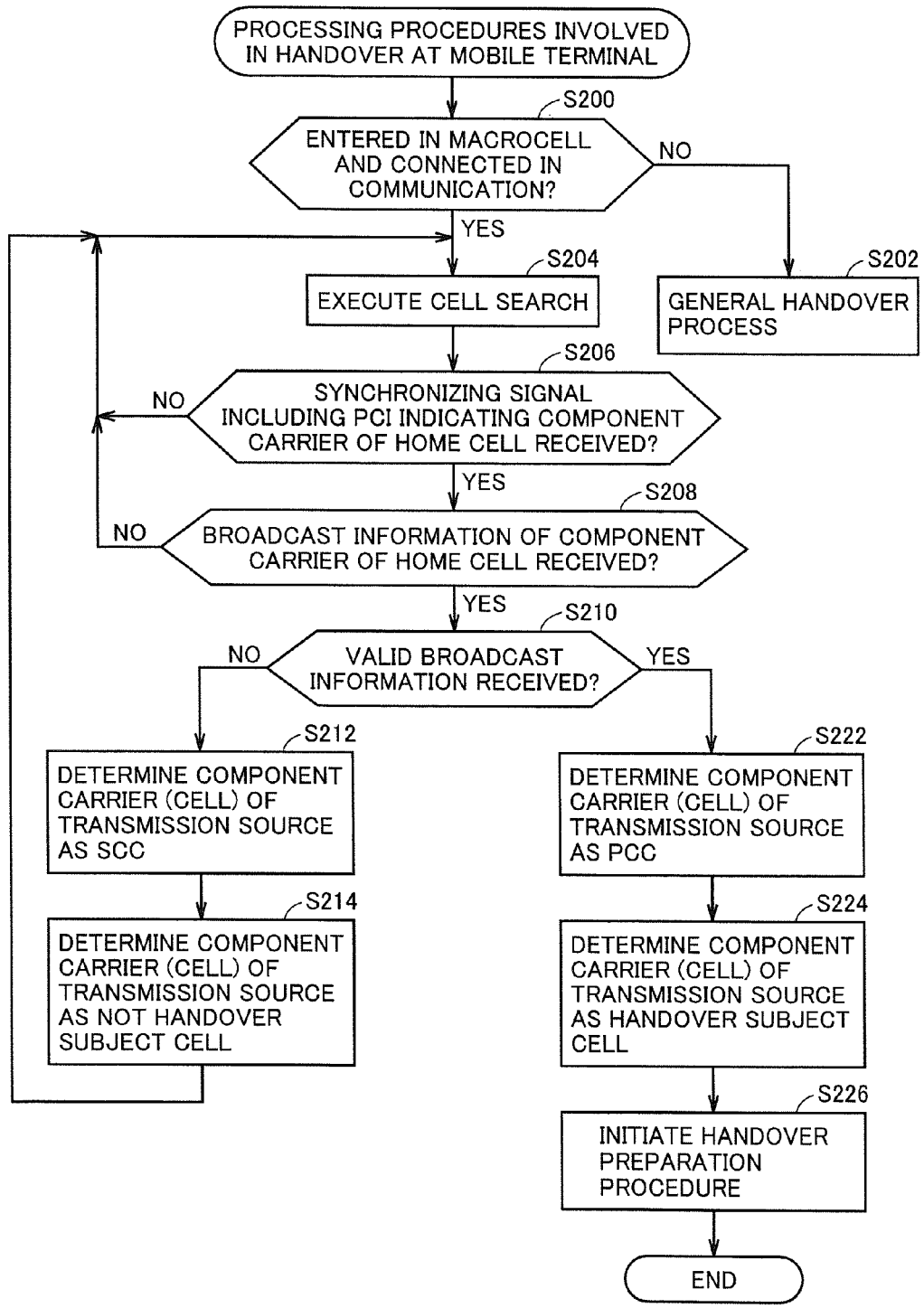
FIG. 13 is a flowchart representing processing procedures involved in handover at a mobile terminal in a wireless communication system according to the second embodiment.

A process flow at mobile terminal 400 according to the second embodiment will be described with reference to FIG. 13. FIG. 13 is a flowchart representing the processing procedures associated with handover at mobile terminal 400 in wireless communication system SYS according to the second embodiment.

First, mobile terminal 400 determines whether it is located in a macrocell, and currently connected in communication or not (step S200). In the case where it is not located in the macrocell, and not currently connected in communication (NO at step S200), a general handover process is executed (step S202).

When located in a macrocell and currently connected in communication (YES at step S200), mobile terminal 400 executes a cell search (step S204). Then, mobile terminal 400 determines whether a synchronizing signal including the PCI indicating the component carrier of the home cell is received or not (step S206). In the case where a synchronizing signal containing the PCI indicating the component carrier of the home cell is not received (NO at step S206), the process of steps S204 and et seq. is executed again.

When a synchronizing signal including a PCI indicating the component carrier of the home cell is received (YES at step S206), mobile terminal 400 determines whether the broadcast information of the component carrier of the home cell has been received or not (step S208). In the case where the broadcast information of the carrier component of the home cell is not received (NO at step S208), the process of steps S204 and et seq. is executed again.

In the case where broadcast information of the component carrier of the home cell is received (YES at step S208), mobile terminal 400 determines whether valid broadcast information is received or not (step S210).

In the case where valid broadcast information is not received (NO at step S210), mobile terminal 400 determines that the component carrier (cell) from which the relevant broadcast information was transmitted is the SCC (step S212). Then, mobile terminal 400 determines that the component carrier (cell) from which the relevant broadcast information was transmitted is not the subject cell of handover (step S214). Then, the process of steps S204 and et seq. is executed again.

In contrast, in the case where valid broadcast information is received (YES at step S210), mobile terminal 400 determines that the component carrier (cell) from which the relevant broadcast information was transmitted is the PCC (step S222). Then, mobile terminal 400 determines that the component carrier (cell) from which the relevant broadcast information was transmitted is the subject cell of handover (step S224). Then, mobile terminal 400 initiates a handover preparation procedure with HeNB 100 for the component carrier (cell) determined to be the subject cell of handover (step S226). Then, upon completion of the inbound handover to HeNB 100, the process ends.

f4: Advantage

According to the second embodiment, mobile terminal 400 receives valid broadcast information from only the PCC when the PCC and SCC are each measured through a cell search. Accordingly, mobile terminal 400 can identify a component carrier differing in nature. Since invalid broadcast information is transmitted from the SCC, mobile terminal 400 can identify the component carrier (cell) that is the subject of handover based on whether valid broadcast information is received or not, even in the case where a plurality of component carriers are provided. Since valid broadcast information cannot be obtained from a SCC, it will not become a handover subject cell.

In other words, when the received broadcast information is not valid, the component carrier from which the relevant broadcast information was transmitted can be removed from the subject cell of handover. Accordingly, any SCC not qualified as the handover target can be removed, and only the PCC can be identified as the subject cell of handover. Since only the PCC can be narrowed down to the subject of handover, the handover preparation procedure such as measurement for the handover target can be simplified. As a result, the inbound handover from a macrocell to the home cell can be performed in a shorter period of time. Moreover, power consumption at mobile terminal 400 can be reduced.

G: Third Embodiment g1: General

The third embodiment will be described based on a mode of using a physical ID (PCI) as an example of notifying a mobile terminal 400 about information directed to identifying the main frequency band (PCC) from a plurality of frequency bands (component carriers) used in carrier aggregation, in a manner allowing discrimination from one or more frequency bands (SCC) other than the main frequency band.

Figure 14:
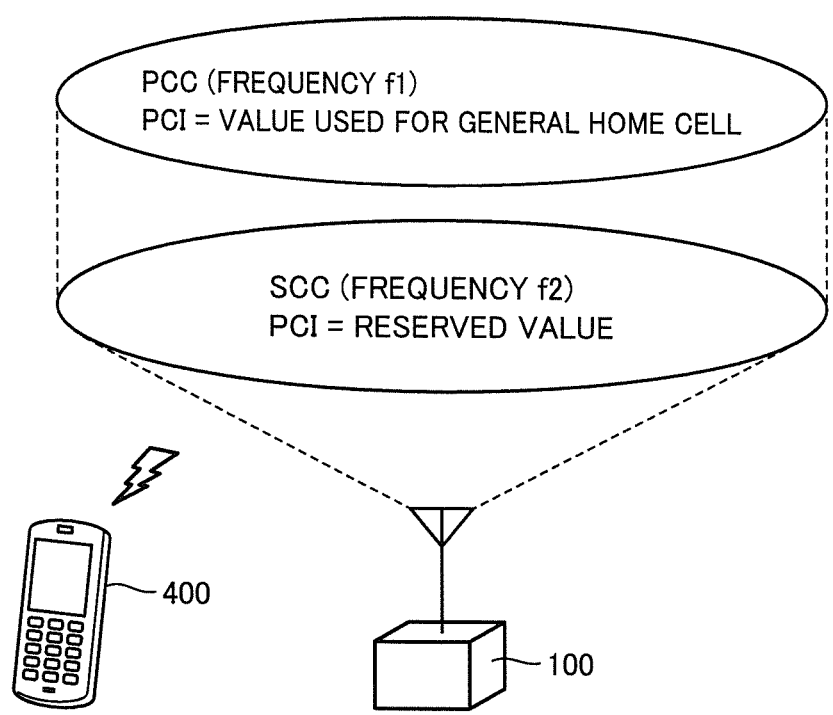
FIG. 14 is a schematic diagram to describe contents of a synchronizing signal in carrier aggregation according to a third embodiment.

FIG. 14 is a schematic diagram to describe contents of a synchronizing signal during carrier aggregation according to the third embodiment. As shown in FIG. 14, the value used for a normal home cell as the PCI is to be set in the synchronizing signal transmitted from the PCC, whereas a reserved particular value is to be set in the synchronizing signal transmitted from the SCC in the third embodiment. In other words, HeNB 100 uses the main frequency band (PCC) to transmit corresponding identification information including a PCI corresponding to a normal home cell, and uses a frequency band (SCC) other than the main frequency band to transmit invalid identification information including a PCI having a reserved particular value set. At that stage, the identification information includes a PCI.

Thus, a synchronizing signal including a normally used PCI is transmitted from the PCC using its frequency band (frequency f1), and a synchronizing signal including a reserved PCI that is not generally used is transmitted from the SCC using its frequency band (frequency f2). In other words, HeNB 100 transmits identification information corresponding to the frequency band, together in the synchronizing signal.

Mobile terminal 400 has a reserved particular value of a PCI stored in advance to determine whether the PCI included in the received synchronizing signal matches the reserved particular value. As a reserved particular value of a PCI, an arbitrary value outside the range generally used as a PCI value is selected. In carrier aggregation, a plurality of SCCs may be used. In this case, one reserved particular value may be set in common for the plurality of SCCs. Alternatively, a plurality of reserved particular values may be set in a storable range according to the storage capacity of mobile terminal 400.

In the case where the PCI included in the received synchronizing signal is a reserved particular value, mobile terminal 400 determines that the component carrier (cell) from which the relevant broadcast information was transmitted is the SCC, and does not take that component carrier as the subject cell of handover. In contrast, in the case where the PCI included in the received synchronizing signal is a value in a range generally used, mobile terminal 400 determines that the component carrier (cell) from which the relevant broadcast information was transmitted is the PCC, and takes that component carrier as the subject cell of handover.

When a component carrier that is the handover subject is determined, mobile terminal 400 initiates a handover preparation procedure with the base station (HeNB 100) that monitors the relevant component carrier (cell).

At this stage, the base station (HeNB 100) requests core network control device 300 to route the data requested to be routed to a SCC through core network 350 to the PCC in order to avoid occurrence of data being routed towards a SCC. When carrier aggregation between mobile terminal 400 and HeNB 100 is established following handover completion, the base station (HeNB 100) schedules the data addressed to the cell ID of the PCC towards the PCC and SCC.

Specifically, HeNB 100 notifies core network 350 that is the upper network to transmit data directed to a cell associated with a frequency band (SCC) other than the main frequency (PCC) to the cell associated with the main frequency band. Then, HeNB 100 transmits the data addressed to the cell associated with the main frequency band, received from core network 350, to mobile terminal 400 using the main frequency band and the one or more frequency bands other than the main frequency band.

By such a process, higher speed communication through a plurality of frequency bands (component carriers) is allowed between mobile terminal 400 and HeNB 100.

g2: Process Sequence

Figure 15:
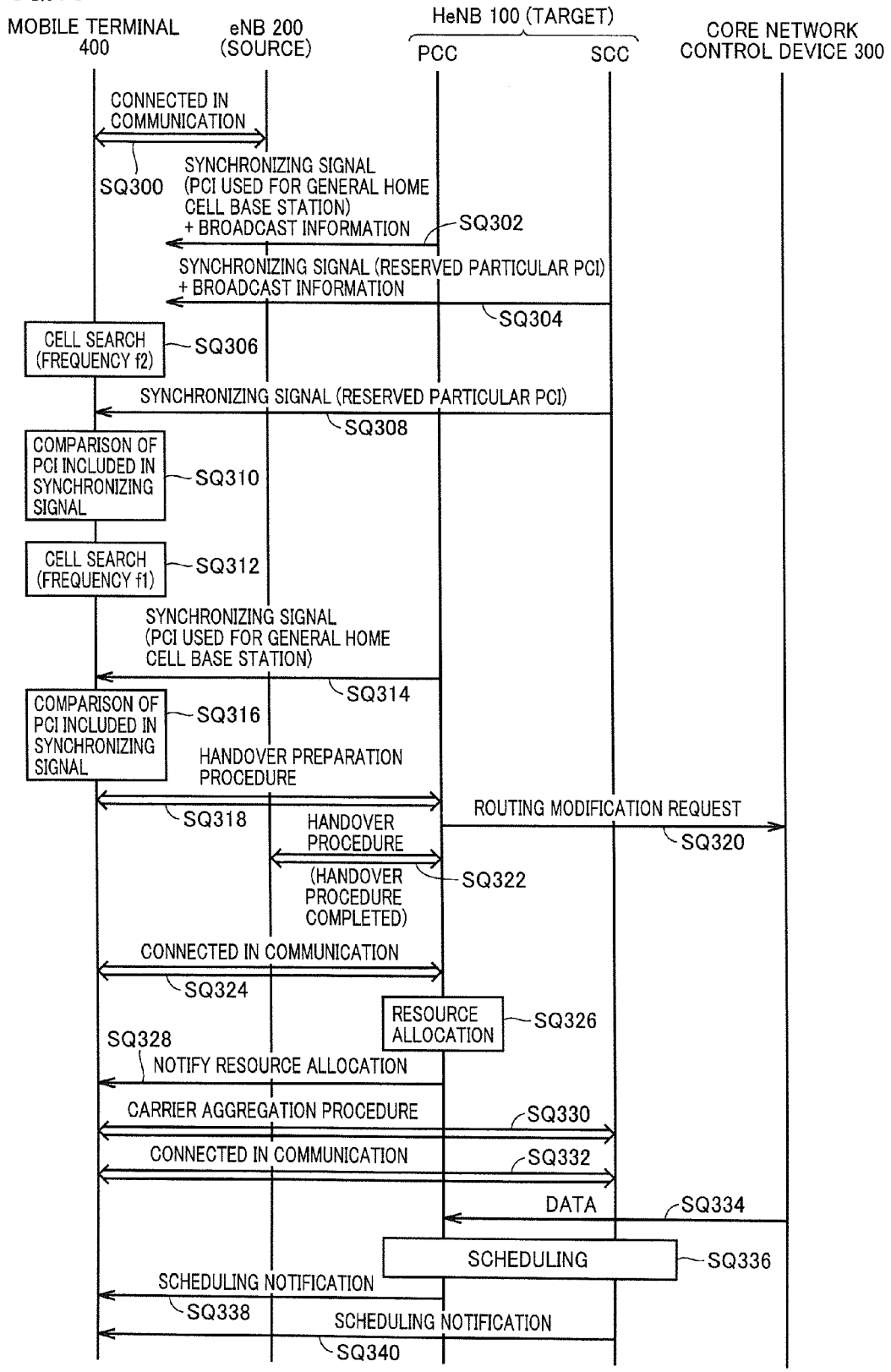
FIG. 15 is a sequence chart representing a handover operation at a wireless communication system according to the third embodiment.

Process sequences according to the third embodiment will be described hereinafter with reference to FIG. 15. FIG. 15 is a sequence chart representing a handover operation at wireless communication system SYS according to the third embodiment.

Referring to FIG. 15, it is assumed that mobile terminal 400 is currently connected in communication with eNB 200 (for example, eNB 200-1 shown in FIG. 1) as the state of the current point in time, as shown in FIG. 1 (sequence SQ300). Here, it is assumed that eNB 200-1 is the source base station of the handover operation whereas HeNB 100 is the target base station of the handover operation.

It is assumed that HeNB 100 adjacent to eNB 200-1 is performing carrier aggregation using the PCC (frequency f1) and one SCC (frequency f2). HeNB 100 transmits a synchronizing signal including the PCI set at a value in a range generally used (a value generally used for a normal home cell base station), generated at PCI generation unit 104, and broadcast information including a cell ID generated at broadcast information generation unit 106, from antenna transmission/reception unit 102 through the PCC (sequence SQ302). Moreover, HeNB 100 transmits a synchronizing signal including the PCI set at a reserved particular value, generated at PCI generation unit 104, and broadcast information including a cell ID generated at broadcast information generation unit 106, from antenna transmission/reception unit 102 through the SCC (sequence SQ304). The transmission timing of the synchronizing signal and broadcast information can be set arbitrarily with each other. The cell ID included in the broadcast information transmitted through the SCC may be a dummy cell ID described in the first embodiment.

It is assumed that mobile terminal 400 prestores a reserved particular value for the PCI, so as to allow determination of the PCI at PCI determination unit 406.

When mobile terminal 400 approaches the cell area of HeNB 100, a synchronizing signal transmitted from HeNB 100 can be received. Mobile terminal 400 determines periodically or at every event whether some synchronizing signal can be received or not.

Here, it is assumed that mobile terminal 400 performs a cell search for frequency f2 in the cell area provided by HeNB 100 (sequence SQ306). Mobile terminal 400 receives a synchronizing signal from the component carrier of frequency f2 (here, the SCC) (sequence SQ308).

PCI determination unit 406 of mobile terminal 400 extracts the PCI value included in the synchronizing signal received from the SCC, and determines whether it matches the reserved particular value or not (sequence SQ310). When the PCI included in the received synchronizing signal matches the reserved particular value, mobile terminal 400 determines that the component carrier corresponding to the received synchronizing signal is the SCC, concluding that it is not the subject cell of handover.

Concurrently with the process set forth above, or subsequent to the process set forth above, it is assumed that mobile terminal 400 performs a cell search for frequency f1 in the cell area provided by HeNB 100 (sequence SQ312). Then, mobile terminal 400 receives a synchronizing signal from the component carrier of frequency f1 (here, the PCC) (sequence SQ314).

PCI determination unit 406 of mobile terminal 400 extracts a PCI value included in the synchronizing signal received from the PCC, and compares it with the reserved particular value to determine whether they match or not (sequence SQ316). When the PCI included in the received synchronizing signal does not match the reserved particular value (not a value generally used for a normal home cell base station), mobile terminal 400 determines that the component carrier corresponding to the received synchronizing signal is the PCC, concluding that it is the subject cell of handover.

Mobile terminal 400 identifies the component carrier (cell) that is the subject of handover based on whether the PCI value included in the synchronizing signal is a value generally used for a normal home cell base station or a reserved particular value, and initiates a handover preparation procedure with the identified component carrier (cell) that is the subject of handover (sequence SQ318).

HeNB 100 to which a handover preparation has been required by mobile terminal 400 requests core network control device 300 to modify routing such that the data requested to be routed to the SCC through the core network is routed to the PCC (sequence SQ320). This is for the purpose of avoiding data to be routed to a SCC that is not the subject cell for handover at the current stage. Specifically, HeNB 100 requests the data towards mobile terminal 400 to be routed to the normal cell ID assigned to the PCC.

When the handover procedure between eNB 200 that is the source base station and HeNB 100 that is the target base station is completed (sequence SQ322), the handover by mobile terminal 400 to the PCC (cell) provided by HeNB 100 is completed. Accordingly, mobile terminal 400 performs communication with HeNB 100 first through the PCC. In other words, mobile terminal 400 attains a currently connected state of communication with the PCC of eNB 200 (sequence SQ324).

Then, HeNB 100 performs scheduling such that mobile terminal 400 can utilize carrier aggregation. In other words, PCC scheduler 112 and SCC scheduler 114 of HeNB 100 allocate an arbitrary resource in the PCC and SCC to mobile terminal 400 (sequence SQ326). Then, HeNB 100 notifies mobile terminal 400 about the resource allocated result through the PCC (sequence SQ328).

In the case where the resource allocated at sequence SQ328 includes a SCC, mobile terminal 400 detects that HeNB 100 provides a SCC in addition to the PCC, and establishes carrier aggregation with HeNB 100. In other words, mobile terminal 400 performs a carrier aggregation procedure with respect to the SCC provided by HeNB 100, and takes the SCC as the communication subject in addition to the PCC (sequence SQ330). By this carrier aggregation procedure, mobile terminal 400 is currently connected in communication with the SCC of eNB 200 (sequence SQ332).

Then, when any data routed based on a normal cell ID is received from core network control device 300 (core network 350), HeNB 100 performs scheduling towards the resource in the PCC and SCC (sequence SQ336). Specifically, PCC scheduler 112 and SCC scheduler 114 of HeNB 100 schedule the data to be transmitted to mobile terminal 400 to an arbitrary resource allocated by itself and in the PCC and SCC corresponding to mobile terminal 400. Then, HeNB 100 notifies mobile terminal 400 about the scheduling result (sequences SQ338 and SQ340).

Thus, mobile terminal 400 performs communication with HeNB 100 through the PCC and SCC.

g3: Process Flow

Figure 16:
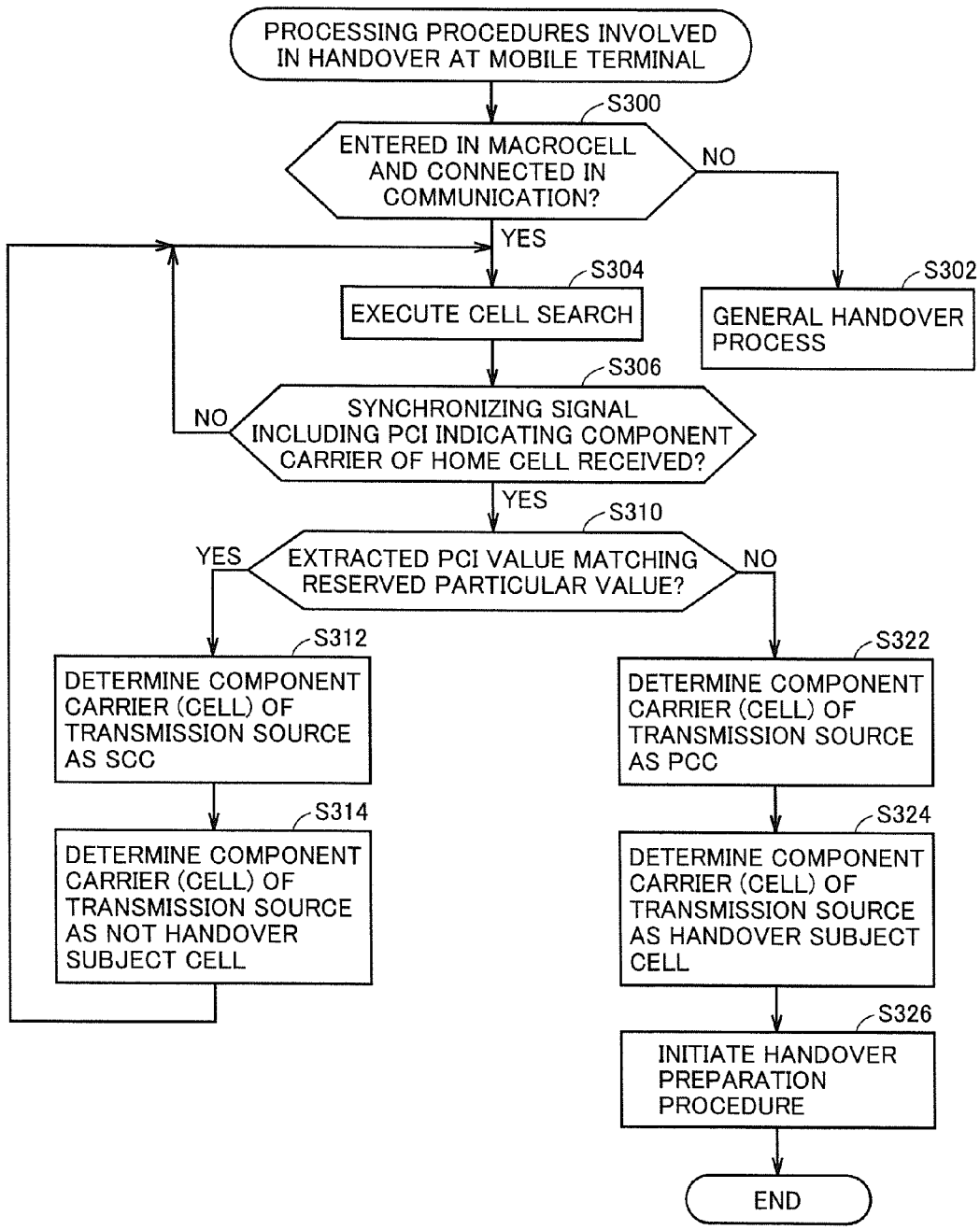
FIG. 16 is a flowchart representing processing procedures involved in handover at a mobile terminal in the wireless communication system according to the third embodiment.

A process flow at mobile terminal 400 according to the third embodiment will be described with reference to FIG. 16. FIG. 16 is a flowchart representing the processing procedures associated with handover at mobile terminal 400 of wireless communication system SYS according to the third embodiment.

First, mobile terminal 400 determines whether it is located in a macrocell, and currently connected in communication or not (step S300). In the case where it is not located in the macrocell, and not currently connected in communication (NO at step S300), a general handover process is executed (step S302).

When located in a macrocell and currently connected in communication (YES at step S300), mobile terminal 400 executes a cell search (step S304). Then, mobile terminal 400 determines whether a synchronizing signal including the PCI indicating the component carrier of the home cell is received or not (step S306). In the case where a synchronizing signal including the PCI indicating the component carrier of the home cell is not received (NO at step S306), the process of steps S304 and et seq. is executed again.

When a synchronizing signal including a PCI indicating the component carrier of the home cell is received (YES at step S306), mobile terminal 400 extracts the PCI included in the received synchronizing information, and determines whether the extracted PCI value matches the reserved particular value (step S310).

In the case where the extracted PCI value matches the reserved particular value (YES at step S310), mobile terminal 400 determines that the component carrier (cell) from which the relevant broadcast information was transmitted is the SCC (step S312). Then, mobile terminal 400 determines that the component carrier (cell) from which the relevant broadcast information was transmitted is not the subject cell of handover (step S314). Then, the process of steps S104 and et seq. is executed again.

In contrast, in the case where the extracted PCI value does not match the reserved particular value (NO at step S310), mobile terminal 400 determines that the component carrier (cell) from which the relevant broadcast information was transmitted is the PCC (step S322). Then, mobile terminal 400 determines that the component carrier (cell) from which the relevant broadcast information was transmitted is the subject cell of handover (step S324). Then, mobile terminal 400 initiates a handover preparation procedure with HeNB 100 for the component carrier (cell) determined to be the subject cell of handover (step S326). Then, upon completion of the inbound handover to HeNB 100, the process ends.

g4: Advantage

According to the third embodiment, mobile terminal 400 receives synchronizing information including a mutually different PCI when the PCC and SCC are each measured through a cell search. Accordingly, mobile terminal 400 can identify a component carrier differing in nature. Since synchronizing information including a PCI set at a reserved particular value is transmitted from the SCC, mobile terminal 400 can identify the component carrier (cell) that is the subject of handover based on whether the synchronizing information including a PCI of a reserved particular value is received or not, even in the case where a plurality of component carriers are provided.

In other words, when the PCI in the received synchronizing information does match the reserved particular value, the component carrier from which the relevant broadcast information was transmitted can be removed from the subject cell of handover. Accordingly, any SCC not qualified as the handover target can be removed, and only the PCC can be identified as the subject cell of handover. Since only the PCC can be narrowed down to the subject of handover, the handover preparation procedure such as measurement towards the handover target can be simplified. As a result, the inbound handover from a macrocell to the home cell can be performed in a shorter period of time. Moreover, power consumption at mobile terminal 400 can be reduced.

H. Other Embodiments

The configuration shown in the first to third embodiments set forth above can be combined appropriately.

Although the first to third embodiments have been described focusing on inbound handover towards a Home evolved Node B (HeNB), the base station to which the present invention can be applied is not limited to a Home evolved Node B (HeNB). The handover operation can be applied to a general evolved Node B (eNB) providing a macrocell, or to base stations of other types.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST

100 HeNB; 101C, 201C-203C cell area; 102, 202 antenna transmission/reception unit; 104, 204 PCI generation unit; 106, 206 broadcast information generation unit; 108, 208, 412 communication control unit; 110, 210, 304 core network communication unit; 112 PCC scheduler; 114 SCC scheduler; 150, 250 gateway; 200 eNB; 212 scheduler; 300 core network control device; 302 main processing unit; 306 backbone communication unit; 308 data storage unit; 310 routing table; 312 entered-cell information; 350 core network; 400 mobile terminal; 402 antenna; 404 reception unit; 406 PCI determination unit; 408 broadcast information determination unit; 410 transmission unit; 414 application unit; SYS wireless communication system.

The invention claimed is:
1. A communication method between a mobile terminal and a plurality of base stations, the communication method comprising the steps of:
when communication through a plurality of frequency bands is possible, broadcasting, from the base station, information directed to identifying a main frequency band from the plurality of frequency bands in a manner allowing discrimination from one or more frequency bands other than the main frequency band, before initiating handover,
receiving at the mobile terminal, information for identifying the main frequency band from a second base station, while having communication connection with a first base station,
initiating at the mobile terminal, a hangover preparation procedure with the identified frequency band among a plurality of frequency bands that are available to the second base station, to perform handover to the second base station,
performing, by the second base station, procedures required for handover of the mobile terminal with the first base station in response to a request from the mobile terminal through the identified frequency band, and
the mobile terminal communicating with the second base station through a plurality of frequency bands.

2. A mobile terminal adapted to communicate with a base station through a plurality of frequency bands, the mobile terminal configured to:
- receive, when communication through a plurality of frequency bands is possible, information for identifying a main frequency band from the plurality of frequency bands, broadcasted from the base station, the information for identifying the main frequency band being notified in a manner allowing discrimination from one or more frequency bands other than the main frequency band, before initiating a handover preparation procedure,
- receive information for identifying a main frequency band from a second base station while having communication connection with a first base station, and
- initiate the handover preparation procedure with the identified frequency band among a plurality of frequency bands that are available to the second base station, to perform handover to the second base station.

* * * * *